(12) United States Patent
Ito

(10) Patent No.: US 6,175,578 B1
(45) Date of Patent: Jan. 16, 2001

(54) OPTICAL DEVICE

(75) Inventor: Hiromasa Ito, 390-82, Aza-Aoba, Aramaki, Aoba-ku, Sendai-shi, Miyagi 980-0845 (JP)

(73) Assignees: Mitsubishi Cable Industries, Ltd., Hyogo; Hiromasa Ito, Miyagi (JP)

( * ) Notice: Under 35 U.S.C. 154(b), the term of this patent shall be extended for 0 days.

(21) Appl. No.: 09/051,977

(22) PCT Filed: Oct. 28, 1996

(86) PCT No.: PCT/JP96/03149
§ 371 Date: Apr. 24, 1998
§ 102(e) Date: Apr. 24, 1998

(87) PCT Pub. No.: WO97/15863
PCT Pub. Date: May 1, 1997

(30) Foreign Application Priority Data

Oct. 26, 1995 (JP) .................................................. 7-302063

(51) Int. Cl.[7] .............................. H01S 3/11; H01S 3/115; H01S 3/10
(52) U.S. Cl. .................................. 372/10; 372/12; 372/17; 372/22
(58) Field of Search .................................. 372/10, 12, 17, 372/22

(56) References Cited

U.S. PATENT DOCUMENTS

| 4,639,923 | * | 1/1987 | Tang et al. .............................. 372/21 |
| 5,128,948 |   | 7/1992 | Papuchon et al. . |
| 5,488,619 | * | 1/1996 | Injeyan et al. .......................... 372/12 |
| 5,513,196 | * | 4/1996 | Bishel et al. ............................ 372/22 |
| 5,699,372 | * | 12/1997 | Okazaki ................................. 372/21 |
| 5,940,419 | * | 8/1999 | Xie ........................................ 372/22 |

FOREIGN PATENT DOCUMENTS

| 04172329 | * | 11/1990 | (JP) . |
| 06027509 | * | 7/1992  | (JP) . |
| 06110095 | * | 9/1992  | (JP) . |

OTHER PUBLICATIONS

English Language Abstract of Japanese Patent No. 04296731 A dated Oct. 21, 1992.
English Language Abstract of Japanese Patent No. 07092513 A dated Apr. 7, 1995.
English Language Abstract of Japanese Patent No. 06088979 A dated Mar. 29, 1994.

(List continued on next page.)

*Primary Examiner*—Frank G. Font
*Assistant Examiner*—Armando Rodriguez
(74) *Attorney, Agent, or Firm*—Wenderoth, Lind & Ponack, L.L.P.

(57) ABSTRACT

The object of the present invention is to provide an optical device which has obliterated, by the use of a nonlinear optical crystal, the need for a complicated adjustment operation of positions as seen in an optical device used for obtaining an output light having a frequency different from an input light. To be specific, Q switching electrodes 12A, 12B, phase adjustment electrodes 9A, 9B and periodic domain inversion part 15 are disposed in desired parts of path 2 in an optical crystal 1 having nonlinear optical character, electro-optical character and laser activity. By the action of an input light P0 supplied from an input side 3, oscillation light P1 is oscillated, harmonic is generated by nonlinear optical character and periodic domain inversion part 15, or output light P2 having a frequency different from that of input light P0 is emitted from output side 4 by optical parametric oscillation. As a result of changes in voltage between phase adjustment electrodes 9A, 9B, the refractive index of the corresponding part of the nonlinear crystal 1 is changed to adjust the oscillation frequency by to total length Lt of path 2. By changing voltage between Q switching electrodes 12A, 12B, a refractive index of slanting intersection of oblique side G of electrode 12A and path 2 can be changed to effect Q switching of oscillation light P1.

20 Claims, 19 Drawing Sheets

OTHER PUBLICATIONS

English Language Abstract of Japanese Patent No. 04172329 A dated Jun. 19, 1992.

English Language Abstract of Japanese Patent No. 06027509 A dated Feb. 4, 1994.

English Language Abstract of Japanese Patent No. 05241217 A dated Sep. 21, 1993.

English Language Abstract of Japanese Patent No. 06110095 A dated Apr. 22, 1994.

Kazi Sarwar Abedin et al., "Integrated electro–optic Q switching in a domain–inverted Nd:LiTaO$_3$ laser", Optics Letters, vol. 20, No. 19, Oct. 1, 1995, pp. 1985–1987.

Takunori Taira et al., "Q–Switching and Frequency Doubling of Solid–State Lasers by a Single Intracavity KTP Crystal", IEEE Journal of Quantum Electronics, vol. 30, No. 3, Mar. 1994, pp. 800–804.

P. Baldi et al., "Efficient Quasiphase–Matched Generation of Parametric Fluorescence in Room Temperature Lithium Niobate Waveguides", Electronics Letters, vol. 29, Aug. 19, 1993, pp. 1539–1540.

Abedin K.S. et al.: "Integrated electro–optic Q switching in a domain–inverted Nd:LiTaO/sub 3/laser", Optics Letters, Oct. 1, 1995, USA, vol. 20, No. 19, pp. 1985–1987, XP002075613ISSN 0146–9592 * abstract; Figures 1,3 *.

Lallier E. et al.: "Short pulse, high power q–switched Nd:MgO:LiNbO/sub 3/waveguide laser", Electronics Letters, Jan. 21, 1993, UK, vol. 29, No. 2, pp. 175–176, XP000331615 ISSN 0013–5194 * p. 175, paragraph 1; Figure 1 * * p. 176, paragraph 1 *.

Abedin et al, Integrated electro–optic Q switching in a domain–inverted ND:LiTaO3, Oct. 1, 1995, Optics Letters, pp. 1985–1987.*

Taira et al, Q–switching and Frequency Doubling of Solid–State Lasers by a Single Intracavity KTP Crystal, Mar. 1994, IEEE Journal of Quantum Electronics, pp. 800–804.*

* cited by examiner

[plane view]

[A-A' cross section]

[perspective view]

[plane view]

[A-A' cross section]

[plane view]

[A-A' cross section]

[perspective view]

[plane view]

[A-A' cross section]

[plane view]

[A-A' cross section]

[plane view]

$Lt = Lt1 + Lt2 + Lt3$

[plane view]

α-SiO₂=rock crystal      LT=LiTaO₃=lithium tantalate
LOB=lighium triborate    BBO=barium borate
LN=LiNbO₃=lithium niobate
KTP=potassium titanylphosphate
LiIO₃=lithium iodide     KNbO₃=potassium niobate
ZnSe=zinc selenide       NPP=(organic material)
MNA=(organic material)

Electron beam irradiation surface
[−Z plane microscopic photograph]

Back surface
[+Z plane microscopic photograph]

FIG. 17

Comparison of tensor component $d_{33}$
and tensor component $d_{31}$
of typical nonlinear optical crystal

| crystal | penetration range (nm) | $d_{33}$ (pm/v) | $d_{31}$ (pm/v) |
|---|---|---|---|
| LiNbO$_3$ | 320-5000 | -40 | -6 |
| LiTaO$_3$ | 280-5000 | -18 | -1 |
| KTP | 350-4500 | -14 | -7 |
| KNbO$_3$ | 350-4000 | -27 | -16 |

LiNbO$_3$ = lithium niobate  
LiTaO$_3$ = lithium tantalate  
KTP = potassium titanylphosphate  
KNbO$_3$ = potassium niobate

OPTICAL DEVICE

TECHNICAL FIELD

The present invention relates to an optical device which causes laser oscillation by excitation with light of a laser activity ion-added optical crystal having nonlinear optical character and electric optical character, namely, an optical crystal having nonlinear optical character, electric optical character and laser activity, as well as generation of second harmonic and optical parametric oscillation, which are based on Q switching of laser and quasi-phase matching by the nonlinear optical character, in a path through the inside of the optical crystal.

BACKGROUND OF THE INVENTION

In this invention, each term means the following.
[Explanation of terms]
Period

In general, the term "period" inherently means a dimension of time. In this invention, however, it also means a dimension of length in a path through which a predetermined light passes inside an optical crystal.

Frequency

While the light is generally expressed by "wavelength", it is expressed by "frequency" in this invention. The "wavelength" corresponding to this "frequency" varies depending on the material of transmission path, as in the case of radio waves.

Optical Parametric Oscillation

This means a phenomenon wherein two frequencies $\omega_s$ and $\omega_i$ are generated by excitation of quadratic polarization with a light wave having a frequency $\omega_p$. The relation of these frequencies is as expressed by the formula:

$$\omega_p = \omega_s + \omega_i.$$

Domain

A region wherein polarization in ferroelectrics occurs in the same direction. The references relevant to this invention include the following.
[References]
Reference 1

P. A. Franken, A. E. Hill, C. W. Peters, G. Weinreich, "Generation of optical harmonics", Phys. Rev. Lett., 7, 118/1961.

Reference 2

J. A. Armstrong, N. Bleombergen, J. Ducuing and P. S. Pershen, "Interaction between light waves in a nonlinear dielectric", Phys. Rev., 127, No. 6, 1918/1962.

Reference 3

Eikai Cho, Hiromasa Ito and Fumio Inaba, 49$^{th}$ Applied Physics Convention, "Experiment of nonlinear light waveguide having domain inversion structure", 7a-ZD-9/1988.

Reference 4

E. J. Lim, M. M. Fejer, R. L. Byer, and W. J. Kozlovsky, "Blue light generation by frequency doubling in periodically poled lithium niobate channel waveguide", Electron. Lett., 25, 731/1989.

Reference 5

J. Webjorn, F. Laurell, and G. Arvidsson, "Blue light generated by frequency doubling of laser diode light in a lithium niobate channel waveguide", IEEE Photon. Tech. Lett., 1, 316/1989.

Reference 6

M. Yamada, N. Nada, M. Saitoh, and K Watanabe, "First-order quasi-phase matched $LiNbO_3$ waveguide periodically poled by applying an external field for efficient blue second-harmonic generation", Appl. Phys. Lett., 62, 435/1993).

Reference 7

Y. Yamamoto, S. Yamaguchi, K. Suzuki, and N. Yamada, "Second-harmonic generation in a waveguide with domain-inverted regions like periodic lens sequence on z-face $KTiOPO_4$ crystal", Appl. phys. Lett., 65, 938/1994.

Reference 8

Toshiaki Saihara, Masatoshi Fujimura and Hiroshi Nishihara, "Waveguide type SHG element by quasi-phase matching", Journal of Electron Information Communication Convention, 76,597/1993.

Reference 9

S. Miyazawa, "Ferroelectric domain inversion in Ti-diffused $LiNbO_3$ optical waveguide", J. Appl. Phys., 50, 4599/1979.

Reference 10

H. Ito, C. Takyu, and H. Inaba, "Fabrication of periodic domain grating in $LiNbO_3$ by electron beam writing for the application of nonlinear optical processes", Electron. Lett., 27, 1221/1991.

Reference 11

Motoki Ohashi, Choichi Takyu and Koichi Taniguchi, "Studies of periodic domain inversion structure of ferroelectric nonlinear optical crystal by electron beam writing", Journal of Electron Information Communication Convention Papers, C-I, J77-C-I, 383/1994.

Reference 12

S. Kurimura, M. Miura, and I. Sawaki, "New method of 20 mm-deep and 3.6 mm-periodic domain inversion for 1st-order quasi-phase matching SHG in $LiTaO_3$ waveguides", Conf. on Lasers and Electro-Optics, CPD5/1992.

Reference 13

Manabu Sato, Motoki Ohashi, Abedin Kaji Sarwar, Choichi Takyu and Masahiro Ito, "Bulk $LiTaO_3$ Domain Inversion Lattice by Electric Field Application Method", Journal of Electron Information Communication Convention Papers, C-I, 366, J78-C-I, August/1995.

Reference 14

K S. Abedin, M. Sato, H. Ito, T. Maeda, K. Shimamura, and T. Fukuda, "Ordinary and extraordinary continuous wave lasing at 1.092 μm and 1.082 μm in bulk Nd: $LiTaO_3$ crystal", J. Appl. Phys., 78,691, July/1995.

Reference 15

A. YARIV et al., OPTICAL WAVES IN CRYSTALS, pp.512–515, Table 12.2, WILEY-INTERSCIENCE, 1983.

Reference 16

Electric Communication Handbook, Ed. 25, First Division, 3·2, "Q switch", Ohm Corp., March, 1979.
[Developmental history of optical device]

Subsequent to the invention of the laser, a technique for generating a second harmonic at 347 nm by ruby laser beam (694 nm) irradiation of rock crystal was disclosed in Reference 1.

Since then, nonlinear optics have been remarkably developed and have become an object of scientific studies, as well as a practical device technique in significant progress.

The development of light wave technique, as in the case of the development of radio wave technique, requires a light source having any wavelength, namely, a light source having any frequency. However, the wavelength of oscillation by laser is principally a specific wavelength determined by the material having a laser activity. Therefore, generation of a light having an optional wavelength, which cannot be obtained directly using a laser, is desired. As a technique for this end, a technique using a material having nonlinear optical character, namely, a nonlinear optical material, has been noticeably developed in recent years.

For an efficient generation of coherent light waves having different wavelengths by the use of a nonlinear optical material, namely, a material having nonlinear optical effect (to be referred to as nonlinear optical character in this invention), it is necessary to realize matching between the velocity at which a new wavelength component, namely, a frequency component, created by mixing plural light waves is polarized, and the transmission velocity of the light wave emitted by the polarization. The matching of the velocities is called phase matching and is generally achieved by the use of a crystal having a birefingence property.

There is a method to achieve phase matching without relying solely on the birefringence property, that is, a method free of limitations in conventional phase matching, and such phase matching method is called a quasi-phase matching. According to this method, the maximum value of a nonlinear optical coefficient component, namely, a nonlinear optical tensor component, can be utilized. The tensor component is disclosed in Reference 15. While the principle proposition of quasi-phase matching appears in Reference 2, due to the difficulty in rotating the optic axis z of a crystal (hereinafter "optical axis z") periodically and precisely by 180° on a $\mu$m order, no specific device has been realized.

The inventor of this invention has disclosed, in Reference 3, a method for quasi-phase matching by a structure capable of periodic domain inversion by diffusion of impurities at periodic intervals on the surface of a material having ferroelectricity due to LiNbO$_3$ (lithium niobate), namely, a ferroelectric crystal. This periodic domain inversion structure can be manufactured by planar processing alone which is similar to that applied to a semiconductor device, and this structure achieves generation of second harmonic of a near infrared ray. Nearly at the time when the above-mentioned Reference 3 reported the technique, similar techniques were disclosed in Reference 4 and Reference 5, and improvements of these techniques were disclosed in References 6–8.

Moreover, the inventor of this invention has disclosed, in References 10, 11 and 13, a technique affording, with regard to a ferroelectric crystal, domain control with precision on a micron order, of a domain inversion structure over the entire substrate, namely, the entire crystal, by an electric means, which domain inversion structure having been made to permit quasi-phase matching by utilizing a nonlinear optical coefficient in a more ensured manner. Specifically, this technique has realized a second harmonic generation at an efficiency near a theoretical value, by forming a periodic domain inversion part of not more than 10 $\mu$m in a z board of LiTaO$_3$ (lithium tantalate) having a thickness of 500 $\mu$m, namely, a crystal board having the optical axis z direction set as in FIG. 19.

In addition, a structure generating millimeter wave to submillimeter wave having frequency $\omega_3$, which is the difference in light wave between two different frequencies $\omega_1$ and $\omega_2$, via quasi-phase matching, as shown in FIG. 18, has been disclosed in Japanese Patent Unexamined Publication No. 6-110095. The "nonlinear optical crystal wherein nonlinear optical coefficient is periodically inverted" in the above-mentioned Japanese Patent Unexamined Publication No. 6-110095 and the periodic domain inversion part in this invention have substantially the same construction.

[quasi-phase matching]

The principle of the generation of harmonic by quasi-phase matching is explained in the following.

In general terms, nonlinear interactions between different wavelengths require phase matching to preserve momentum and to preserve energy. When such a requirement is not fulfilled, a nonlinear polarization wave induced in a substance by incident light wave and the light wave emitted by this nonlinear polarization wave interfere with each other to cancel each other, thus resulting in a failure to achieve effective conversion of frequencies.

In a second harmonic generation (hereinafter SHG), as shown in FIG. 10(c), harmonic output includes constant maximum level and minimum level repeats at an extremely weak intensity, in every interference distance calculated by the following formula, namely, length of coherence, Lc.

$$Lc = \frac{\lambda_F}{4|n_{SH} - n_F|} \quad (1)$$

wherein $\lambda$ is a wavelength, n is a refractive index, an inferior subscript F is a fundamental wave, and SH means harmonic component. Therefore, once the +/− symbols of the polarization wave generated every coherence length, Lc, can be alternately inverted by some means, the harmonic output can be effectively overlapped over the entire part subjected to the alternate inversion. In other words, by setting the period of domain inversion, namely, the domain period T, to twice the length of coherence, Lc, namely, 2Lc, the diffusion inside the nonlinear optical crystal can be cancelled to simulate phase matching, as shown in FIG. 10, part (a).

The stimulatory phase matching in this way is called quasi-phase matching (hereinafter to be referred to as QPM). A nonlinear optical material having a great tensor component but optically isotropic, or incapable of phase matching due to too great a dispersion, can be subjected to phase matching by this quasi-phase matching, thereby enabling utilization of such nonlinear optical material for SHG.

When the domain period T is set to thrice the length of coherence, Lc, namely, 3Lc, the outcome will be as shown in FIG. 10, part (b). The conditions to be fulfilled to perform QPM are generally expressed by the following formula:

$$T = 2mL_C = \frac{m\lambda_F}{2|n_{SH} - n_F|} \quad (2)$$

wherein m is a positive integer of 1, 2, 3 . . . and is an order of domain period T. In FIG. 10, (a) is the case where T=Lc, m=1; (b) is the case where T=3Lc, m=3; and (c) is the case where such domain period is not set, namely, phase mismatch.

When using a material dimensionally controlled to effect inversion as exemplified by periodic inversion of nonlinear optical coefficient d into +d and −d, the dimensional distribution of this nonlinear coefficient is subjected to Fourier expansion to determine the effective nonlinear optical coefficient.

In this case, when the ratio of the width of the part wherein z axis is substantially inverted about the z axis of the crystal substrate, to domain period T, namely, the ratio of the inverted width t to the domain period T in FIG. 14, which is called a duty ratio, is expressed by $\xi$ ($0 \leq \xi \leq 1$), the maximum efficiency of QPM can be achieved when m=1 and $\xi$=0.5. At a higher order action, the highest efficiency can be achieved when m=2 and $\xi$=0.25. Accordingly, for a highly efficient quasi-phase matching, the control of the duty ratio $\xi$ is essential.

On the other hand, a nonlinear optical material is requested to have a broad pass band and a large nonlinear optical coefficient d, since it is used in the wavelength band where it is transmitted, namely, transmission frequency band. The relationship between the cut-off point of pass band at short wavelength side, i.e., high frequency side, of each optical material, and a relative property index $d^2/n^3$ is as shown in FIG. 11.

In this quasi-phase matching, therefore, an optical material having a greater nonlinear optical coefficient d can be used under the optimal operative conditions free of limitations imposed on conventional phase matching. As shown in FIG. 11, $LiNbO_3$ (QPM) and $LiTaO_3$ (QPM) by QPM show properties superior to that of $LiNbO_3$ and $LiTaO_3$ without QPM.

A material having such a nonlinear optical character is required to be highly efficient. In addition, for a greater output to be achieved, the input should be also great, and such great input may destroy the nonlinear optical material. Thus, this material is suitable for a nonlinear optical interaction at low and medium output levels.

The relation between a transmission wavelength range of each typical optical crystal suitable for QPM and a nonlinear optical coefficient, namely, tensor components $d_{33}$, $d_{31}$ is shown in FIG. 17, and the use of tensor component $d_{33}$ results in better QPM than the use of other tensor components such as tensor component $d_{31}$.

However, since the tensor component $d_{33}$ is usable when all electric fields to be interacted are parallel to the optical axis z of an optical crystal, it cannot be used at all in an interaction using conventional birefringence.

In other words, according to the QPM, $LiNbO_3$ crystal, for example, permits effective use of the value of −40 pm/V of tensor component $d_{33}$, which is about 7 times greater than that of the conventional tensor component $d_{31}$, which is −6 pm/V. Thus, the QPM enables the use of a nonlinear optical coefficient which is about 7 times greater than the conventional one. As shown in FIG. 17, it is one of the materials having the greatest nonlinear character in the wavelength range of not more than wavelength 0.4 μm.

[periodic domain inversion structure]

For periodic inversion of poling direction in a crystal as shown by the symbols of the polarized waves in FIG. 18, the +/− symbols of nonlinear optical coefficients need only be reversed. Therefore, a method for reversing the optical axis, namely, z axis, inside the optical crystal can be used. Such inversion of the z axis is called domain inversion in this invention. When the ferroelectric is a crystal of $LiNbO_3$ or $LiTaO_3$, a structure wherein the ferroelectric domains are alternately inverted by 180° at certain periods, namely, a periodic domain inversion part 15, need only be formed.

Reference 9 and others disclose that, particularly in +z plane, namely, a plane orthogonal to the optical axis z of a crystal and disposed on the plus direction side of the z axis, the domain inversion occurs by internal factors such as impurities and distortion, and external factors such as heat and electric field. Such inversion is considered to be mainly caused by lowered Curie temperature in the part where impurities are dispersed. Therefore, when a domain inversion structure is manufactured by surface processing based on the dispersion of the impurities, namely, by processing from the surface of the crystal, while positively utilizing this major cause, the degree of freedom in structural development of the device can be markedly increased as compared to the manufacture method employed to form domain inversion structure having an optional shape, along with conventional crystal pulling.

Reference 3—Reference 5 disclose a technique of such domain control of a nonlinear optical material by processing from the surface. However, the domain inversion based on the diffusion of Ti (titanium) carried out in early stages was associated with disadvantages in that, since changes in refractive index were always observed, it was susceptible to diffraction and dispersion, and that treatment at high temperatures was necessary.

In order to overcome this inconvenience, the inventor of this invention performed periodic inversion of domain only with electron beam and electric field at room temperature, in an attempt to realize a periodic domain inversion structure without variations in refractive index, and disclosed, in Reference 10, a method for causing domain inversion by electron beam irradiation alone without application of heat or electric field.

This method comprises deposition of a metal such as chromium on the +z plane of $LiNbO_3$ substrate and exposure, to electron beam, of the part on the −z plane without deposition, namely, the plane opposite from the +z plane, where domain inversion is desired, whereby a desired pattern is drawn thereon to give a periodic domain inversion structure.

The electron beam is hit using a modified scanning electronmicroscope. For example, when a domain inversion at a period of 7.5 μm is desired on a z board (500 μm thick) as a substrate, entire process scanning is performed at accelerating voltage of 25 kV, a dose of $2\times10^9$ electrons/sec at zero DC bias at room temperature. According to the conventional method, a DC voltage needs to be applied to the both sides of a z board having an elevated temperature. This method obliterates such operation.

The surface of $LiNbO_3$ having a domain inversion structure formed by periodic domain inversion by the above-mentioned electron beam irradiation was etched and observed by an optical microscopy. As a result, as shown in [−z plane microscopic photograph] and [+z plane microscopic photograph] of FIG. 12, domain inversion by electron beam irradiation was successively performed not only on the −z plane on the electron beam irradiation side but also to the +z plane on the rear side, and y plane, namely, a plane orthogonal with the mechanical axis y of the crystal, after cutting, polishing, etching and similar observation, showed extremely regular formation of main inversion layers from −z plane to +z plane. Here, the relation of electron beam irradiation and each plane of the optical crystal is as shown in FIG. 19.

The process of domain inversion formation is considered to be such that accelerated electron beam advances to the depth of only 1–2 μm from the crystal surface to charge only locally, and at the vicinity of the surface, binding of atoms is loosened due to the injection impact of electrons to cause easy movement of the atoms, which leads to dislocation of Li (lithium) ions now easily mobile in local electric field and inversion of spontaneous polarization, which inversion once caused at a certain part is repeated in the z axis direction of the created electric field to ultimately reach +z plane on the rear surface.

However, the domain inversion by the above-mentioned electron beam tends to be associated with the difficulty in forming a successive dean shape. This is caused by a slight imbalance between the electric charge accumulated on the insulated part and the electric charge from spontaneous inversion of the substrate, wherein the charges are not completely offset but remain. This inconvenience is disclosed in Reference 11.

On the other hand, a potential domain control by direct electric field is expected and a method of domain inversion by direct application of electric field to a ferroelectric via stripe-patterned electrodes has been studied. Reference 6 discloses domain inversion of $LiNbO_3$ by the application of pulse electric field at around room temperature, and Reference 12 discloses domain inversion of LiTaO$_3$ by the application of electric field. In these methods involving application of electric fields, the voltage to be applied should be strictly controlled, since the voltage is near dielectric breakdown voltage of crystal.

Thus, the inventor of this invention has disclosed, in Reference 13, a method for forming a bulk domain inversion lattice wherein periodic domain inversion is performed not only on the surface of a nonlinear optical LiTaO$_3$ crystal but also in mostly the entire thickness direction of the optical crystal by the application of electric field.

According to this method, for example, a LiTaO$_3$ z board (500 $\mu$m thick) as a substrate, which is a plate crystal having a surface plane and a bottom plane both orthogonal to optical axis z, is used Using the plane on the plus side of optical axis z as +z plane and that on the minus side as −z plane, a certain pattern is formed on the +z plane, namely, Al (aluminum) electrode having a stripe pattern formed by periodic domain inversion is deposited on the +z plane in a certain pattern, and Al electrode is uniformly deposited on the entirety of −z plane. The substrate is set in a vacuum chamber, and a direct voltage is applied between the electrodes on both sides. The stripe patterned electrode has a length of 4 mm, and three periods of 7.5 $\mu$m, 7.8 $\mu$m and 8.1 $\mu$m are formed simultaneously at different positions on the same substrate.

The time-course changes in the applied voltage and inversion current were, as shown in FIG. 13, that the applied voltage was increased at ca. 2.5 kV/10 sec; domain inversion current was 10.4 kV, which means that it began to flow from the vicinity of the voltage corresponding to 20.8 kv/mm; when the applied voltage was maintained at a constant value of ca. 10.5 kV, the inversion current reached the maximum value of ca. 750 nA after a certain period of time, at which level the domain inversion occurred in the patterned part; and about 1 minute later, the current stopped automatically. The applied voltage from which inversion current began to flow matched with the anti-electric field voltage of LiTaO$_3$ at room temperature, namely, voltage before the occurrence of voltage breakage.

With regard to the injection charge for the above-mentioned domain inversion, since the charge during spontaneous polarization on the surface of LiTaO$_3$ substrate is generally electrically neutralized with positive ion or electron, in the case of domain inversion by the application of electric field, the total amount of injected charge doubles during spontaneous polarization, upon injection of positive charge from the upper electrode, as in the case of domain inversion by electron beam irradiation, due to the neutralization of the surface charge and generation of electric field by domain inversion.

In the embodiment shown in FIG. 13, the injected charge measured was 27.6 $\mu$C which is almost the same as 28.0 $\mu$C by calculation. The injected charge corresponds to the area of the pattern of the patterned electrode. Therefore, it can be used as a parameter of domain control.

[Generation of second harmonic by quasi-phase matching]

In the generation of a second harmonic by a LiTaO$_3$ crystal, the relationship between the wavelength of the fundamental wave when QPM order is first order (m=1) and second order (m=2), and the period of domain inversion as calculated by the formula (2) is expressed by the solid line in FIG. 15.

The evaluation test of LiTaO$_3$ which underwent periodic domain inversion by the application of direct voltage by the above-mentioned patterned electrode was run by input-processing the output of the second harmonic by a computer, while continuously sweeping the oscillation wavelength of Ti:Al$_2$O$_3$ (titanium sapphire) laser.

The relationship between the generation intensity of second harmonic at different domain periods T, namely, 7.5 $\mu$m, 7.8 $\mu$m and 8.1 $\mu$m and the wavelength $\lambda_F$ of the fundamental wave at the ⊙ wherein order m=2 in FIG. 15, is shown in FIG. 16.

The double-dotted line in FIG. 15 represents the value at wavelength 1064 nm of Nd:YAG (neodymium.yttrium.aluminum.garnet) laser widely used as a solid-state laser, which indicates quasi-phase matching at a domain period of 7.8 $\mu$m.

In addition, the width of the synchronization spectrum of fundamental wave at the generation intensity of second harmonic relative to each domain period T, namely, half-value breadth, was ca. 0.81 nm and almost the same for the three curves in FIG. 16.

Since the theoretical value of this width is 0.74 nm, the periodic domain inversion parts are considered to have been almost uniformly prepared, though with standard error within the range of experimental manufacture error. In addition, the experiment on the ⊙ point wherein m=1 in FIG. 15 was for the confirmation by the output of optical parametric oscillation. In this case again, the experimental results match well with the calculation results.

Since the light wave is subject to diffraction during transmission, it is essential for a the most efficient generation of second harmonic to collect light wave of the wavelength corresponding to the length of beam path in an optical device, namely, the length of the device. Under the conditions wherein conforcal length of the gauss beam and the above-mentioned device length were synchronized, the conversion efficiency $\eta_b$ is calculated from the following formula.

$$\eta_b = \frac{P_{SH}}{P_F^2 L} = \frac{2}{\pi C}\left(\frac{\mu_0}{\varepsilon_0}\right)^{3/2}\frac{\omega_F^3 \cdot d_{eff}^2}{n_{SH} \cdot n_F} \quad (3)$$

wherein $P_{SH}$ is output of second harmonic, $P_F$ is input of fundamental wave, L is device length mentioned above, c is light speed, $\mu_0$ is permeability of vacuum, $\varepsilon_0$ is permittivity of vacuum, $\omega_F$ is angular frequency of fundamental wave and d$_{eff}$ is effective second order nonlinear optical coefficient.

The reason for using the second order nonlinear optical coefficient here is that the nonlinear optical coefficient includes all nonlinear optical coefficients, such as second order, third order, fourth order and so on, but the generation of second harmonic by quasi-phase matching requires the use of only second order nonlinear optical coefficient.

In QPM wherein m=2, $P_F$ was 32 mW, L was 4 mm and $P_{SH}$ was 1.9 $\mu$W.

From these results, it is known from formula (3) that the experimental value of $\eta_b$ was 0.46%/W cm. Since the duty ratio $\xi$ of the domain inversion structure prepared was ca. 0.63 by measurement, $\eta_b$ was 0.48%/W cm, similarly from formula (3). This means that the experimental value and the theoretical value are almost the same. However, by setting the duty ratio $\xi$ to an optimal value of 0.5, the value of normalized conversion efficiency $\eta_b$ can be increased by about 20%.

On the other hand, for efficient optical parametric oscillation utilizing the above-mentioned QPM, the distance between the reflecting mirrors of the oscillator, which are separately set at the both ends of an optical crystal, is changed to achieve harmonization with the excitation wave input as an oscillation source.

Further, a method using Q switching may be employed to obtain the oscillation output by such laser as pulsed output having a greater peak. The structure of such Q switching may be one wherein a saturatable absorption cell formed separately from optical crystal is placed on or off the oscillation path, or one wherein ultrasound output to be applied to an ultrasound switch formed separately from an optical crystal is changed, which are disclosed in Reference 16 and others.

According to the above-mentioned prior art techniques, almost all parts in the structures used to obtain output light by harmonic based on QPM or by frequency conversion, or optical parametric oscillation based on QPM, have individual structures. In these structures, a fine oscillation adjustment operation to achieve oscillation by changing the distance between the reflecting mirrors of the oscillator, fine adjustment operation to align optical axis with the direction of the optical axis of the lens and Q switch, and the like are necessary.

Therefore, an optical device comprising a single element constituting these parts, which permits electronic adjustment operation, will be extremely convenient for users. It remains to be solved, however, how to constitute such optical device.

SUMMARY OF THE INVENTION

According to the above-mentioned prior art techniques, an optical crystal of a nonlinear optical material, such as $LiTaO_3$ lithium tantalate), has been used for QPM or optical parametric oscillation based on QPM by merely utilizing its nonlinear optical character alone.

In the present invention, a note was taken to the fact that such optical crystal shows electro-optical effect (to be referred to as electro-optical character in this invention) as well, and an optical crystal was doped with an element having laser activity, such as Nd (neodymium). In this manner, a single device structure has made it possible, firstly, to electronically achieve the above-mentioned fine oscillation adjustment operation of an optical crystal based on phase delay utilizing changes in refractive index caused by the electro-optical character of the optical crystal itself, by disposing electrodes at necessary parts of the crystal and applying necessary voltage to the electrodes, and, secondly, to enable laser oscillation having Q-switching function based on the refraction caused by the electro-optical character of the optical crystal, upon application of necessary voltage to electrodes similar to the above.

BRIEF DESCRIPTION OF THE DRAWINGS

FIG. 10–FIG. 19 show prior art techniques, wherein each Figure shows the following:

FIG. 1 includes a plane view showing the entire structure, a vertical cross sectional view and a perspective view showing the principal part.

FIG. 2 shows character of the action of the principal part.

FIG. 3 shows character of the action of the principal part.

FIG. 4 includes a plane view showing the entire structure and vertical cross sectional view.

FIG. 5 includes a plane view showing the entire structure, a vertical cross sectional view and a perspective view showing the principal part.

FIG. 6 includes a plane view showing the entire structure and a vertical cross sectional view.

FIG. 7 includes a plane view showing the entire structure and a vertical cross sectional view.

FIG. 8 includes a plane view showing the entire structure and a vertical cross sectional view.

FIG. 9 is a plane view showing the structure of the principal part.

FIG. 10 shows character of the action of the principal part.

FIG. 11 shows character of the action of the principal part.

FIG. 12 includes microscopic photographs of the structure of the principal part.

FIG. 13 shows character of the action of the principal part.

FIG. 14 includes microscopic photographs of the structure of the principal part.

FIG. 15 shows character of the action of the principal part.

FIG. 16 shows character of the action of the principal part.

FIG. 17 shows comparison of the character of the principal part.

FIG. 18 is a plane view showing the structure of the principal part.

FIG. 19 is a perspective view showing the structure of the principal part.

Each symbol in the Figures means the following.

| 1 | :optical crystal | 2 | :path |
|---|---|---|---|
| 3 | :input side | 3A | :end plane |
| 3B | :output path | 4 | :output side |
| 4A | :end plane | 4B | :output path |
| 5A | :mirror | 5B | :mirror |
| 9A | :electrode for phase adjustment | 9B | :electrode for phase adjustment |
| 12A | :electrode for Q switching | 12B | :electrode for Q switching |
| 15 | :periodic domain inversion part | 31 | :side |
| 31A | :mirror | 32 | :side |
| 32A | :reflecting mirror | 32 | :side |
| 33 | :reflecting mirror | 51 | :end plane |
| 61 | :binding prism | 62 | :end plane |
| P0 | :input light | P1 | :oscillation light |
| P2 | :output light | | |

DESCRIPTION OF THE PREFERRED EMBODIMENTS

The embodiments of the present invention are explained by referring to FIG. 1–FIG. 9. In FIG. 1–FIG. 9, the like reference symbols as in FIG. 10–FIG. 19 refer to the parts having the same function as do the parts in FIG. 10–FIG. 19 having the like symbols. In addition, the parts having the same reference symbols as in any of FIG. 1–FIG. 9 have the same function as explained in those Figures.

First Embodiment

Figure 1:
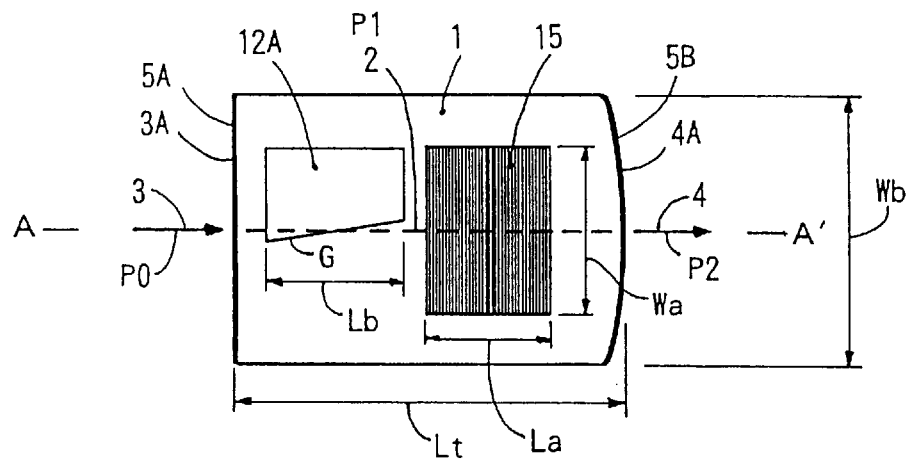
FIG. 1–FIG. 9 show embodiments of the present invention.
Figure 1:
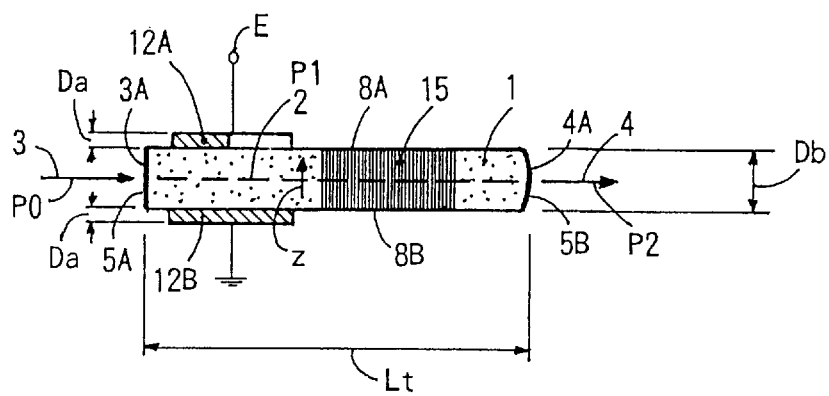
Figure 1:
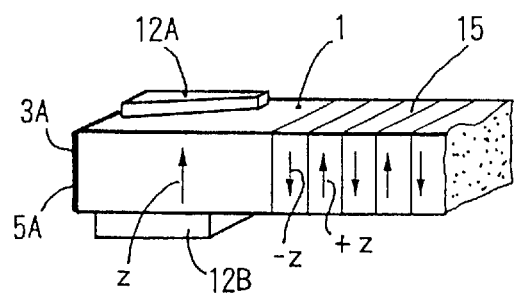
Figure 2:
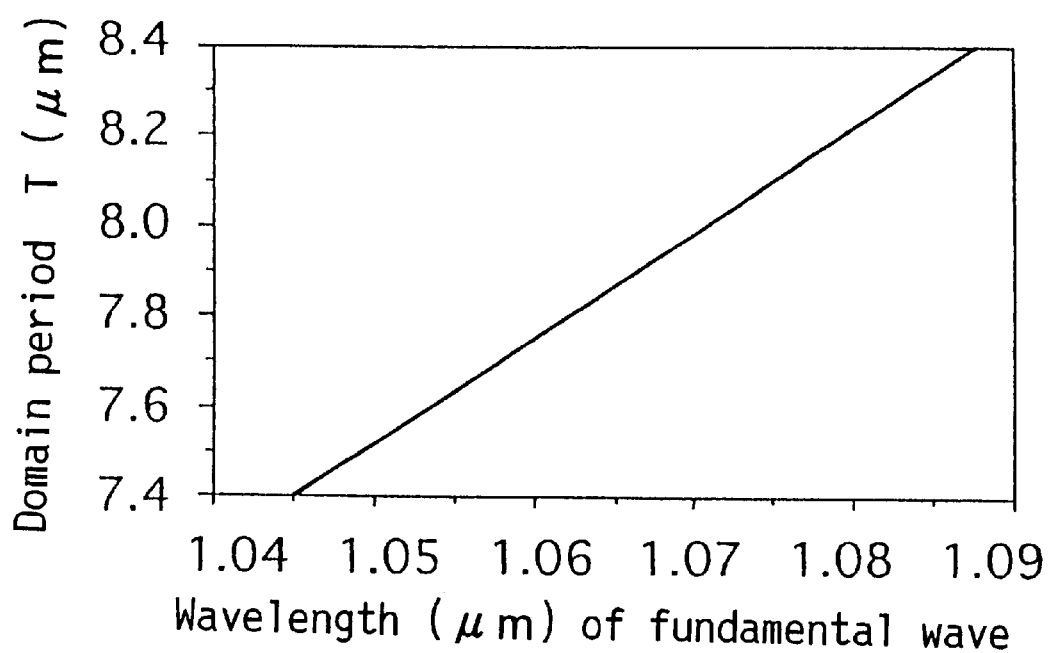
Figure 3:
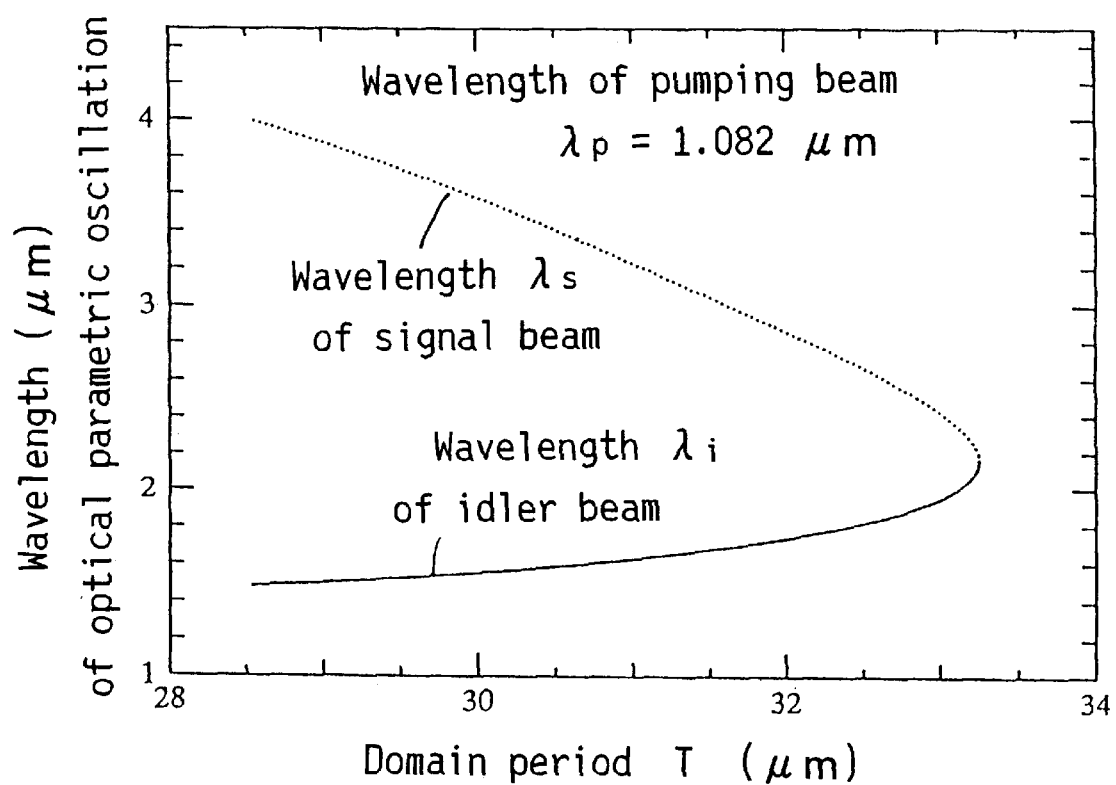

The first embodiment is explained by referring to FIG. 1–FIG. 3. This embodiment shows an optical device wherein QPM at a periodic domain inversion part and Q switching, both in the above-mentioned prior art technique, are performed by a single element of optical crystal.

In FIG. 1, an optical crystal 1 is an optical crystal having nonlinear optical character, electroptical character and laser activity, which is obtained by, for example, forming a crystal of $LiTaO_3$ (lithium tantalate) doped with Nd (neodymium, weight ratio 4.4%), namely, $Nd:LiTaO_3$ (neodymium.lithium tantalate) crystal, into a rectangular plate which has the size of, for example, about width Wb=3–15 mm, total length Lt=5–20 mm and thickness Db=0.5–1 mm, as shown in FIG. 1, and this crystal performs QPM and Q switching in the predetermined path 2 through the inside of the optical crystal 1, which path being set as a beam path.

The periodic domain inversion part 15 is a necessary part in the path 2 which was subjected to periodic domain inversion by the above-mentioned prior art technique. Specifically, it is a part having a domain inversion structure like the polarization at periodic domain inversion part 15 in FIG. 18, wherein the z axis at the part of width t is inverted at every predetermined domain period T.

The domain inversion structure may be one wherein domain inversion has not been performed in the entire thickness Db, namely, may include a small part in the thickness direction which is free of domain inversion, as in the above-mentioned prior art technique. Alternatively, this part may be abraded to make the entire thickness Db have a domain inversion structure.

The size of the periodic domain inversion part 15 is about a width Wa=24 mm and a length La=2–15 mm. It is formed about the path 2 as the center. The width Wa may be the same as width Wb and the electrode used for the domain inversion by the application of high voltage may not be removed but left as it is.

The electrodes 12A, 12B for Q switching are electrodes formed in parts different from the part where periodic domain inversion part 15 is disposed, on both surfaces 8A, 8B in the direction orthogonal with the optical axis of the optical crystal 1, namely, the z axis. One of the electrodes, electrode 12A, is formed to have a wider side before path 2 and narrow side beyond path 2 to form a trapezoid shape, and a slanting side of the trapezoid shape, namely, the about center of the oblique side G, crosses path 2. The angle of the oblique side is about 2–5° and the length Lb is about 2–6 mm.

The other electrode 12B is disposed opposite to electrode 12A with regard to path 2 and is a larger rectangle than electrode 12A Al (aluminum) is deposited on electrodes 12A, 12B in the thickness of Da=ca. 0.1–0.3 $\mu$m.

Here, Nd (neodymium) functions as laser activity ion in the optical crystal 1. Excitation of the laser activity ion with input light P0 leads to laser oscillation to generate light P1 having a specific coherent frequency. This specific frequency is determined mainly by energy level by laser activity and falls within a certain range. The frequency can be varied in this range by the total length Lt of the path 2 in the optical crystal 1. That is, a coherent light P1 can be generated, which has a frequency determined by the laser activity and the total length Lt of the path 2.

Then, by changing voltage E to be applied between electrodes 12A, 12B for Q switching, for example, from 600 V to 0 V, the beam passing through path 2 is caused to have a different refractive index based on electro-optical character, thereby to perform Q switching. That is, once voltage E is applied between electrodes 12A and 12B for Q switching, the part of the optical crystal 1, where the voltage has been applied, is caused to have a different so-called "refractive index" as referred to in the refractive index value table, and the transmission velocity of the beam in this part changes relative to other parts.

Inasmuch as the boundary between the part having varied transmission velocity and other parts is diagonal relative to path 2 at the side G, the beam passing the path 2 is deflected at this boundary, and variation in voltage E results in Q switching. Therefore, the intersection angle between the oblique side G and path 2 is determined in relation to the property of the optical crystal 1 and the voltage to be applied. It is essential that the oblique side G diagonally pass the entirety of the beam passing through path 2, and that an included angle be as small as possible from the experimental results.

The end plane 3A on the input side 3 giving the input light P0 to the optical crystal 1 is formed as a plane parallel to the z axis. In addition, a semitransparent mirror 5A is set, which is coated with thin multi-layers of necessary dielectric, such as $SiO_2$ (silicon oxide) and $Zr_2O_3$ (zirconium oxide). The end plane 4A on the output side 4 releasing the output light P2 is formed, for example, with a curved surface having a focus at the center of end plane 3A, and a semitransparent mirror 5B like mirror 5A of end plane 3A is set.

[Summary of construction of first embodiment]

The construction of the above-mentioned first embodiment is summarized in the following.

For example, it is an optical device wherein a predetermined input light P0, namely, excitation light, is applied from a predetermined input plane, such as end plane 3A on the input side 3, of an optical crystal 1 having nonlinear optical character, electro-optical character and laser activity, such as $Nd:LiTaO_3$ (neodymium.lithium tantalate) crystal, and oscillation light P1 obtained by laser oscillation of laser activity ion, Nd (neodymium) ion, is subjected to quasi-phase matching by the nonlinear optical character of the periodic domain inversion part 15 set in the predetermined path 2 passing inside the optical crystal 1, whereby a coherent beam having a predetermined frequency is output as output light P2 from the predetermined output plane of the above-mentioned optical crystal 1, such as end plane 4A on the output side 4, said the optical device having an electrode means for Q switching, comprising electrodes 12A, 12B facing each other disposed at parts different from the periodic domain inversion part 15 on both surfaces 8A, 8B in the direction orthogonal with the optical axis of optical crystal 1, namely, the z axis.

In addition to this, this embodiment gives an optical device having a Q switching means to perform Q switching of the above-mentioned output light P2 based on the above-mentioned electro-optical character, by changing, in a predetermined manner, the voltage E to be applied between the above-mentioned electrodes 12A and 12B facing each other.

[First utilizable construction of first embodiment]

In a first utilizable construction of the optical device of the first embodiment, coherent light P1 of first frequency $\omega_1$ determined by laser activity and the total length of path 2, Lt, is generated by exciting laser activity ion an optical crystal 1, using input light P0 as the light source for excitation, and domain period T of periodic domain inversion part 15 is formed corresponding to the formula (2), thereby causing quasi-phase matching. In this way, a coherent optical beam having a frequency $\omega_2=2\omega_1$ corresponding to a second harmonic component of oscillation light P1 is obtained as output light P2.

For example, the relationship between the oscillation light P1 and the domain period T, when the above-mentioned $Nd:LiTaO_3$ is used, is as shown in FIG. 2. By setting the total length Lt of path 2 to cause oscillation with both oscillation light P1 and output light P2, the output of output light P2 can be increased, and by ON-OFF of the application of voltage E to effect Q switching, output light P2 can be made a pulse-like great output having, for example, several dozen to several hundred times greater peak value.

When the specific frequency relationship is shown by wavelength, for example, input light P0 can be set to 0.8 $\mu$m, oscillation light P1 to 1.08 $\mu$m, and output light P2 to 0.54 $\mu$m.

[Second utilizable construction of first embodiment]

In a second utilizable construction of the optical device of the first embodiment, input light P0 and oscillation light P1 are treated in the same manner as in the above-mentioned first utilizable construction to generate oscillation light P1 as a coherent light of first frequency $\omega_1$, and domain period T of periodic domain inversion part 15 is set to one which gives a second frequency $\omega_2$ and a third frequency $\omega_3$ by optical parametric oscillation of first frequency $\omega_1$, whereby coherent output light P2 of second frequency $\omega_2$ and third frequency $\omega_3$ is obtained.

Here, the relation of respective frequencies $\omega_1 \cdot \omega_2 \cdot \omega_3$ is expressed by the following formula of optical parametric oscillation.

$$\omega_1 = \omega_2 + \omega_3 \quad (4)$$

In this utilizable construction, when using specifically the above-mentioned Ni:LiTaO$_3$ as an optical crystal 1, as shown in FIG. 3, wavelength $\lambda_1$ by first frequency $\omega_1$ of oscillation light P1 is wavelength $\lambda_p$ of pumping beam, and wavelengths $\lambda_s \cdot \lambda_i$ of frequency $\omega_2 \cdot \omega_3$ of output light P2, which outputs wavelength $\lambda_i$ of idler frequency and wavelength $\lambda_s$ of signal beam, are defined by domain period T. The relation of these wavelengths $\lambda_i$ and $\lambda_s$ is expressed by the above-mentioned (4).

In the above-mentioned construction, total length Lt of path 2 is made to oscillate with $\lambda_s$ to output coherent light beam of $\lambda_s$ and $\lambda_i$ as idler. By reversing them to make total length Lt of path 2 oscillate with $\lambda_i$, $\lambda_i$ can be output and $\lambda_s$ can be idler. The Q switching can be made completely the same as in the above-mentioned first utilizable construction.

[Third utilizable construction of first embodiment]

In a third utilizble construction of the optical device of the first embodiment, input light P0 consists of two input lights, one of which is used to excite laser activity in an in optical crystal 1, whereby coherent light P1 having a first frequency $\omega_1$ defined by laser activity and the total length Lt of path 2, as in the above-mentioned first utilizable construction, is generated as mediation light. In addition, in the same manner as in FIG. 18, coherent output light P2 having frequency $\omega_3$, which is the difference between second frequency $\omega_2$ of the other input light of the two input lights constituting input light P0, and first frequency $\omega_1$ of oscillation light P1, is obtained by quasi-phase matching by domain period T of periodic domain inversion part 15. The Q switching can be made completely the same as in the above-mentioned first utilizable construction.

[Fourth utilizable construction of first embodiment]

In a fourth utilizable construction of the optical device of the first embodiment, input light P0 is used as an input light having a first frequency $\omega_1$, and by this input light P0, the laser activity ion in the optical crystal 1 is excited. As a result, coherent light P1 having a second frequency $\omega_2$, defined by laser activity and total length Lt of path 2, is generated as a mediation light. In addition, by quasi-phase matching by domain periodic T of periodic domain inversion part 15, and in the same manner as in FIG. 18, coherent output light P2 having frequency $\omega_3$, which is the difference between the second frequency $\omega_1$ of the input light P0, and the frequency $\omega_2$ of oscillation light P1, is obtained. The Q switching can be made completely the same as in the above-mentioned first utilizable construction.

Second Embodiment

The second embodiment is explained in the following by referring to FIG. 4. In this embodiment, electrodes 12A, 12B in the first embodiment in FIG. 1 are superimposed on the part where the periodic domain inversion part 15 is set, and the vicinity of the center of the oblique side G of electrode 2A crosses path 2, so that the total length Lt of path 2 is shortened and the size of the optical device is reduced, while bearing the same function.

Figure 4:
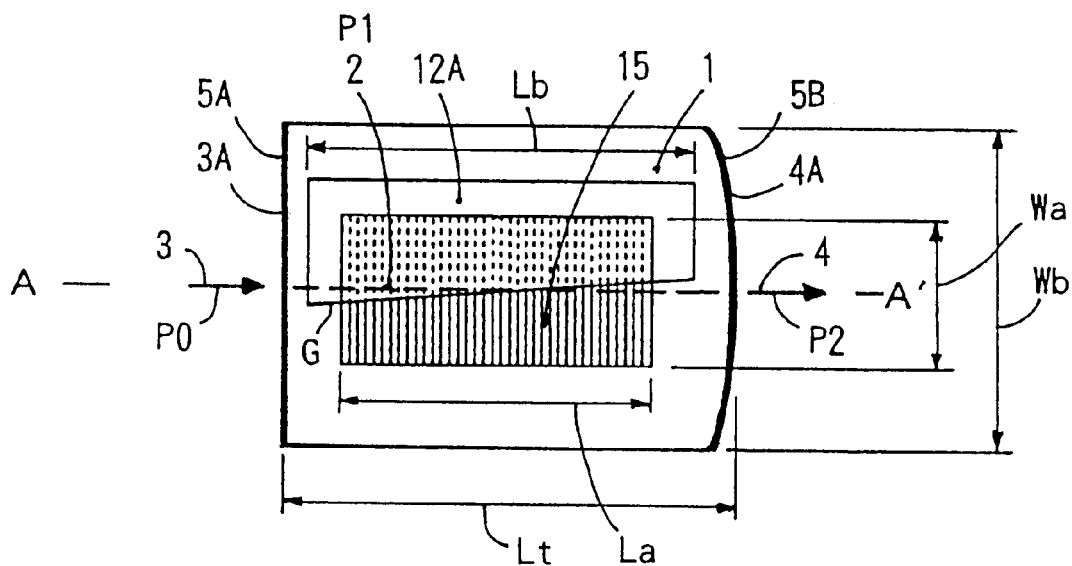
Figure 4:
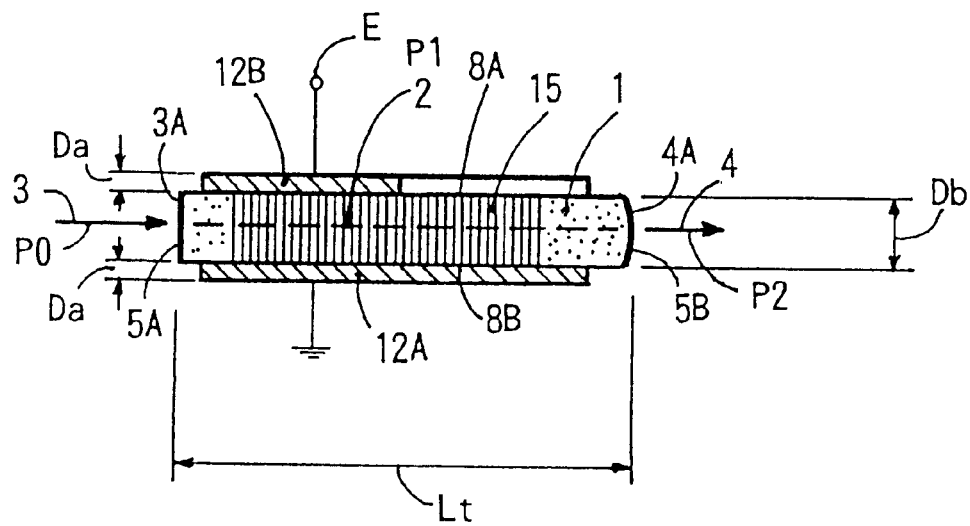

In FIG. 4, electrodes 12A, 12B are formed on both surfaces 8A, 8B facing the part where periodic domain inversion part 15 has been formed, and the length Lb of the electrodes 12A, 12B is made slightly longer than the length La of the periodic domain inversion part 15. Other than that, the rest has the same function as in the first embodiment shown in FIG. 1.

Therefore, the part subject to quasi-phase matching by periodic domain inversion part 15, and the part for Q switching performed by changing voltage E to be applied to electrodes 12A, 12B are superimposed at the same part of path 2.

[Summary of construction of second embodiment]

The second embodiment is summarized in the following in terms of its construction.

Instead of the electrode means for Q switching of the above-mentioned first embodiment, this optical device has an electrode means for Q switching, which comprises electrodes 12A·12B facing each other on the both surfaces 8A, 8B in the direction orthogonal with the optical axis of the above-mentioned optical crystal 1, namely, the z axis, at the part where periodic domain inversion part 15 is set.

[Utilizable constructions of second embodiment]

The utilizable constructions of second embodiment are completely the same as the first to fourth utilization constructions of the above-mentioned first embodiment.

Third Embodiment

The third embodiment is explained in the following by referring to FIG. 5. In this embodiment, the construction of the first embodiment shown in FIG. 1 is used except that electrodes are formed to apply voltage to change the total length Lt of path 2 as a result of changes in refractive index based on the electro-optical character, wherein the electrodes are formed as a phase adjustment part to adjust the phase of the light passing path 2 by changing the total length Lt of path 2.

Figure 5:
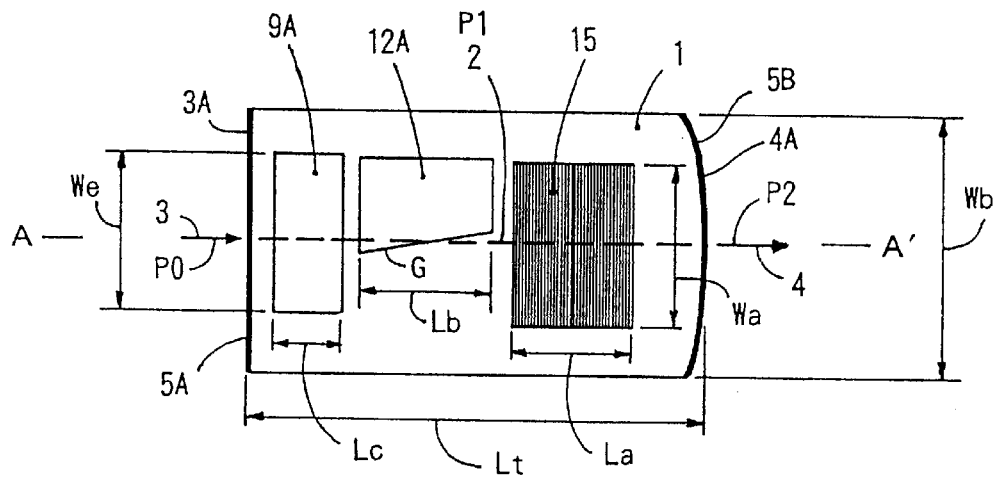
Figure 5:
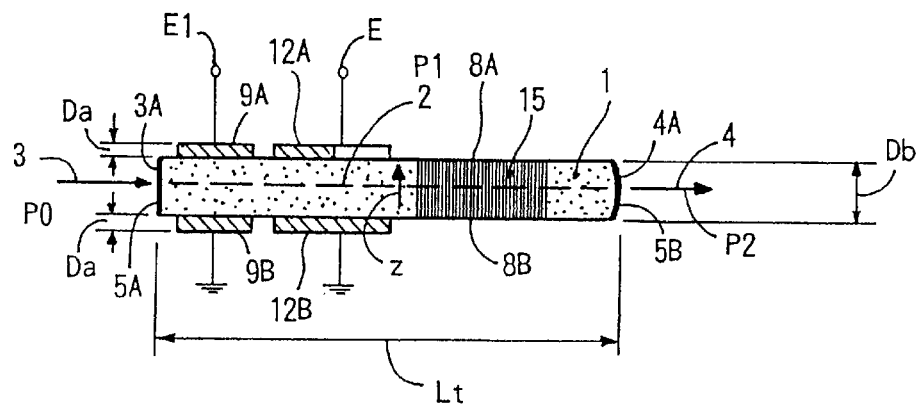
Figure 5:
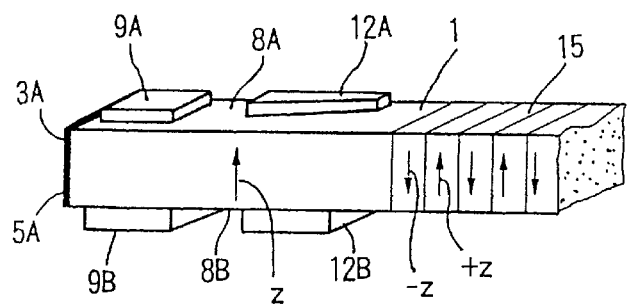

In FIG. 5, the parts other than electrodes 9A, 9B for phase adjustment are the same as in the first embodiment in FIG. 1. The electrodes 9A, 9B are set on parts of the both surfaces 8A, 8B, which parts being other than periodic domain inversion part 15 in path 2 and electrodes 12A, 12B. The four-sided electrodes 9A, 9B are both disposed in symmetrical relation to path 2 and have a width We of about the same size with the width Wa of periodic domain inversion part 15 and a length Lc of about 1–5 mm.

To be specific, they have the size of a width We=2 mm and a length Lc=ca. 1–5 mm, where a thin film of Al (aluminum) is deposited in a thickness of Da=ca. 0.1–0.5 $\mu$m, which is formed simultaneously with electrodes 12A, 12B. The electrode 9B to be formed on the same side with electrode 12B from the Q switching electrodes 12A, 12B may be formed sequentially with the electrode 12B as a single rectangular shape.

The voltage E1 to be applied between electrodes 9A, 9B for phase adjustment is varied between, for example, 0 V and 100 V, to cause changes in refractive index of the light transmitted in path 2, based on the electroptical character, thereby causing changes of the phase of the beam. In this way, the total length Lt of the path 2 is changed.

That is, the part of the optical crystal 1 where a voltage E1 is applied undergoes changes in refractive index in so-called refractive index table, so that the transmission velocity of the light at this part in path 2 is changed. Therefore, by the same action causing changes in the total length of path 2, it ultimately functions as the phase adjustment part to adjust the phase of the light passing through path 2.

When the phase is greatly changed, the adjustment of the phase of the light results in changes in frequency, and the phase adjustment in this invention includes adjustment resulting in such changes in frequency.

[Summary of construction of third embodiment]

The construction of the third embodiment is summarized in the following.

In addition to the construction of the first embodiment, this optical device has a phase adjustment electrode means comprising second facing electrodes 9A, 9B disposed on the above-mentioned both surfaces 8A, 8B, at parts other than the part where the periodic domain inversion part 15 is disposed and the parts where the above-mentioned first facing electrodes 12A, 12B for Q switching are disposed.

In addition to this, this embodiment provides an optical device comprising a phase adjustment means for adjusting the phase of the light transmitted in the path 2 based on the above-mentioned electro-optical character, by causing pre-determined changes in voltage E1 to be applied between the above-mentioned second facing electrodes 9A and 9B.

[First utilizable construction of third embodiment]

The fist utilizable construction of the optical device of the third embodiment includes the second utilizable construction of the above-mentioned optical device of the first embodiment, wherein the path 2 in the total length Lt is oscillated simultaneously with the first frequency $\omega_1$ of oscillation light P1 and the second frequency $\omega_2$ of optical parametric oscillation, or oscillated simultaneously with the first frequency $\omega_1$ of oscillation light P1 and the third frequency $\omega_3$ of optical parametric oscillation, by variation of voltage E1 to be applied to electrodes 9A, 9B.

In other words, by changing the voltage E1 applied to electrodes 9A, 9B, refractive index is changed based on the electro-optical character of the optical crystal 1 to result in variation in the phase of the light passing the path 2. Therefore, when the voltage E1 is gradually changed, since path 2 in total length oscillates simultaneously with the objective first frequency $\omega_1$ and second frequency $\omega_2$, or the first frequency $\omega_1$ and third frequency $\omega_3$, at a certain voltage level, by maintaining the voltage E1 at the particular voltage level, the output of output light P2 can be maximized and threshold value of the optical parametric oscillation can be reduced.

[Other utilizable construction of third embodiment]

Besides the above-mentioned first utilizable construction, various constructions can be made as in the optical device of the above-mentioned first embodiment to obtain a desired light having a desired frequency as output light P2, so that a second harmonic can be obtained by quasi-phase matching, or a light having a frequency corresponding to the difference between two frequencies can be obtained.

In these constructions, by changing the voltage E1 applied to electrodes 9A, 9B, the total length Lt of path 2 can be changed and made to oscillate with the frequency of the desired light.

Fourth Embodiment

The fourth embodiment is explained in the following by referring to FIG. 6. This embodiment comprises the construction of the second embodiment shown in FIG. 4, except that electrodes 9A, 9B for phase adjustment shown in FIG. 5 are formed to cause changes in the total length Lt of path 2, by changing refractive index based on electro-optical character, and to function as a phase adjustment part to adjust the phase of the light passing through path 2.

Figure 6:
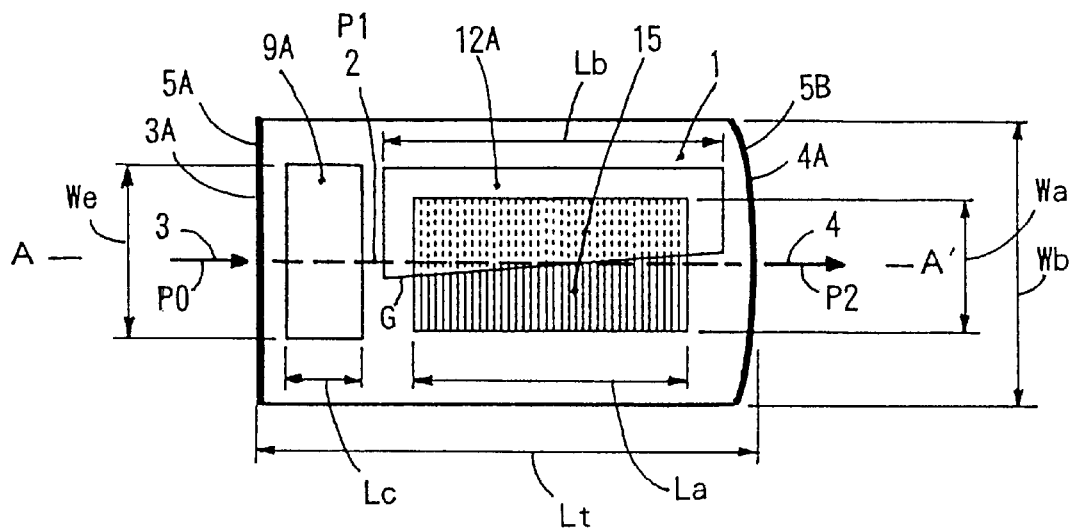
Figure 6:
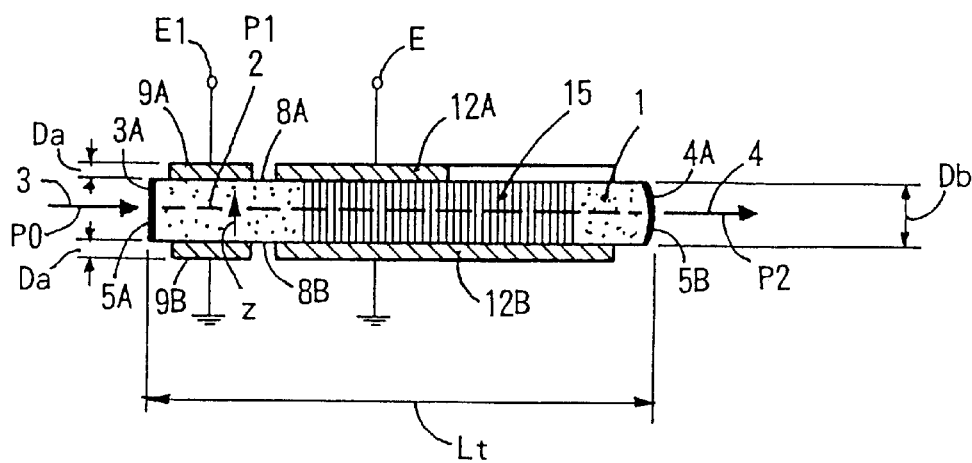

In FIG. 6, the construction of the parts other than the parts where electrodes 9A, 9B are formed for phase adjustment is completely the same as that of second embodiment shown in FIG. 4, and the construction of electrodes 9A, 9B for phase adjustment and the construction of the phase adjustment part for adjusting the phase of the light passing through path 2 by changing the voltage E1 to be applied to electrodes 9A, 9B, are completely the same with the construction of the electrodes 9A, 9B for phase adjustment in the third embodiment shown in FIG. 5 and the construction of voltage E1.

In addition, the quasi-phase matching by the periodic domain inversion part 15 and Q switching by electrodes 12A, 12B for Q switching and voltage E are completely the same as those in the first embodiment, and phase adjustment action by electrodes 9A, 9B for phase adjustment and voltage E1, are completely the same as those in the embodiment shown in FIG. 5.

[Summary of construction of fourth embodiment]

The construction of the fourth embodiment is summarized in the following.

In addition to the construction of the second embodiment, this optical device has a phase adjustment electrode means comprising second facing electrodes 9A, 9B disposed at parts other than the parts where the above-mentioned first facing electrodes 12A, 12B for Q switching are disposed on the above-mentioned both surfaces 8A, 8B.

In addition to this, this embodiment provides an optical device comprising a phase adjustment means for adjusting the phase of the light transmitted in the path 2, based on the above-mentioned electro-optical character, by causing pre-determined changes in voltage E1 to be applied between the above-mentioned second facing electrodes 9A and 9B.

[Utilizable constructions of fourth embodiment]

The utilizable constructions of the fourth embodiment are completely the same as the above-mentioned constructions of the above-mentioned third embodiment.

Fifth Embodiment

Figure 7:
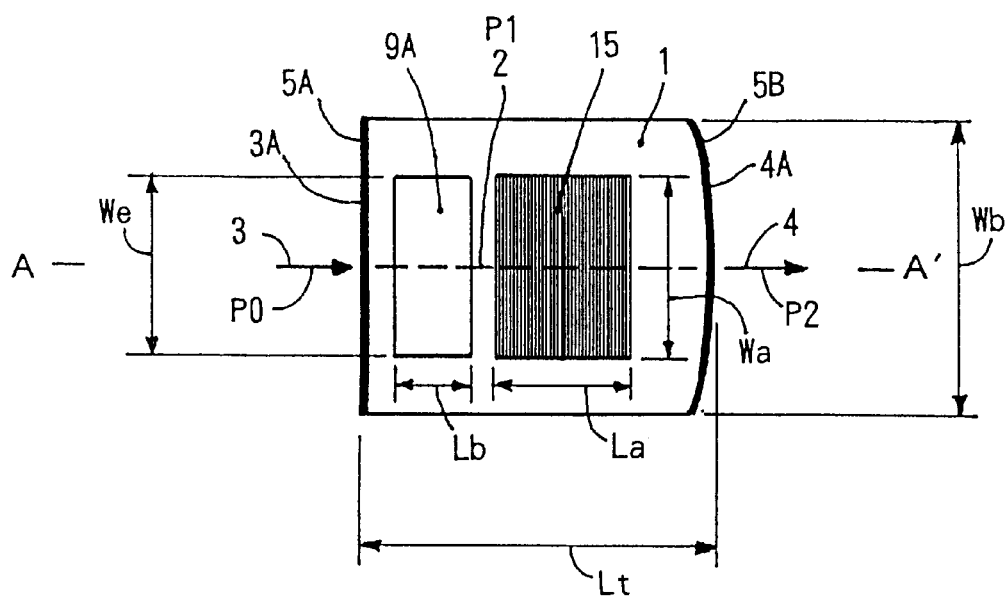
Figure 7:
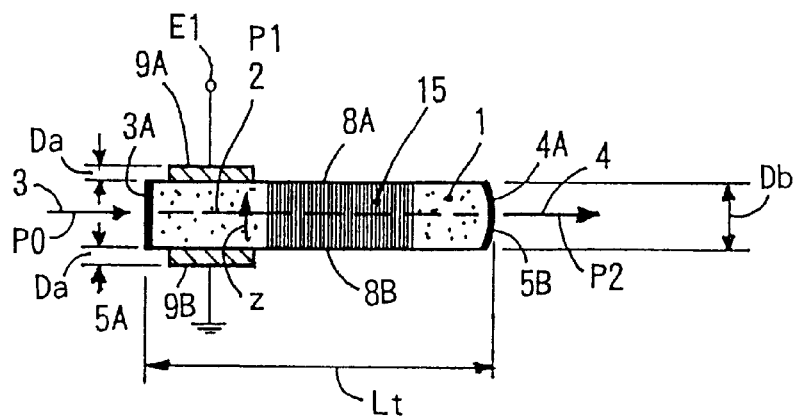

The fifth embodiment is explained in the following by referring to FIG. 7. This embodiment has the construction of the fourth embodiment shown in FIG. 6, except that electrodes 12A, 12B for Q switching are removed to eliminate any electrode in the periodic domain inversion part 15, and electrodes 9A, 9B for phase adjustment are disposed as they are. Namely, the construction where Q switching function has been removed from the function of the fourth embodiment.

[Utilizable constructions of fifth embodiment]

The utilizable constructions of the fifth embodiment are the constructions wherein Q switching function has been removed from the functions of the above-mentioned fourth embodiment.

Sixth Embodiment

The sixth embodiment is explained in the following by referring to FIG. 8. This embodiment is the same as respective embodiments explained by way of FIG. I–FIG. 7, except that the outer shape of the planar surface of the optical crystal 1, which is rectangular in FIG. 1–FIG. 7, and path 2, which is linearly formed in FIG. 1–FIG. 7, are changed in such a manner that the outer shape of the planar surface of the optical crystal 1 is made to have a polygon shape and path 2 is made to be formed by reflection at the predetermined side of the polygon of the optical crystal 1.

Figure 8:
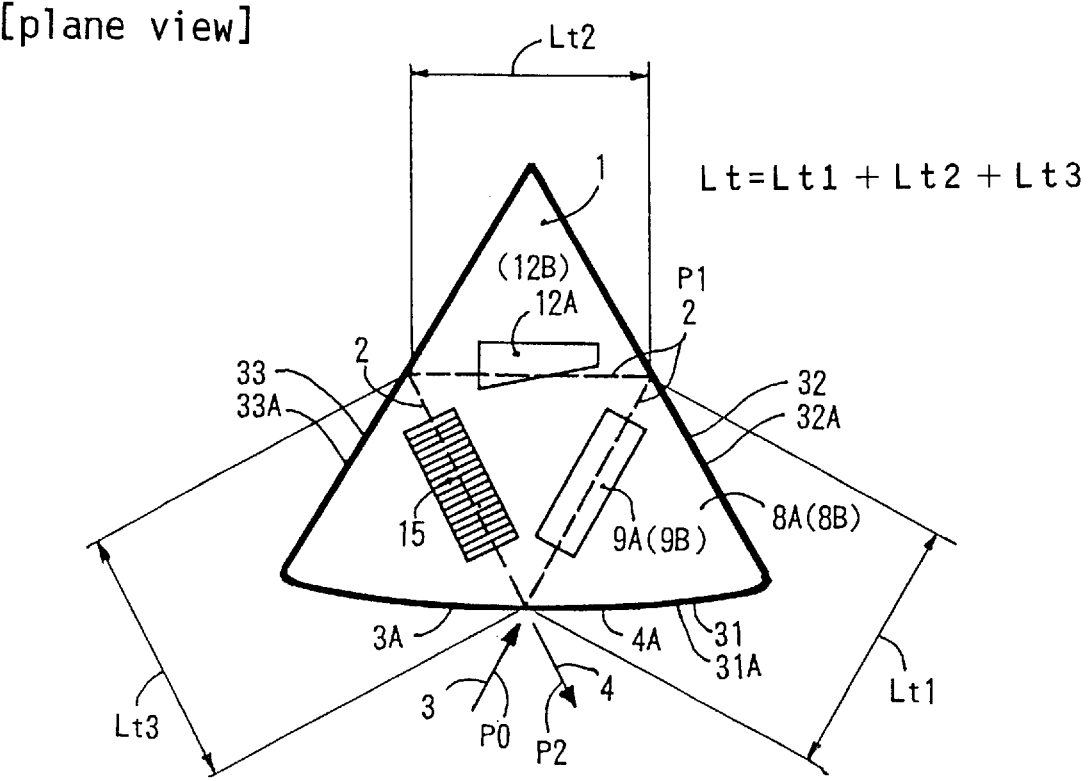
Figure 8:
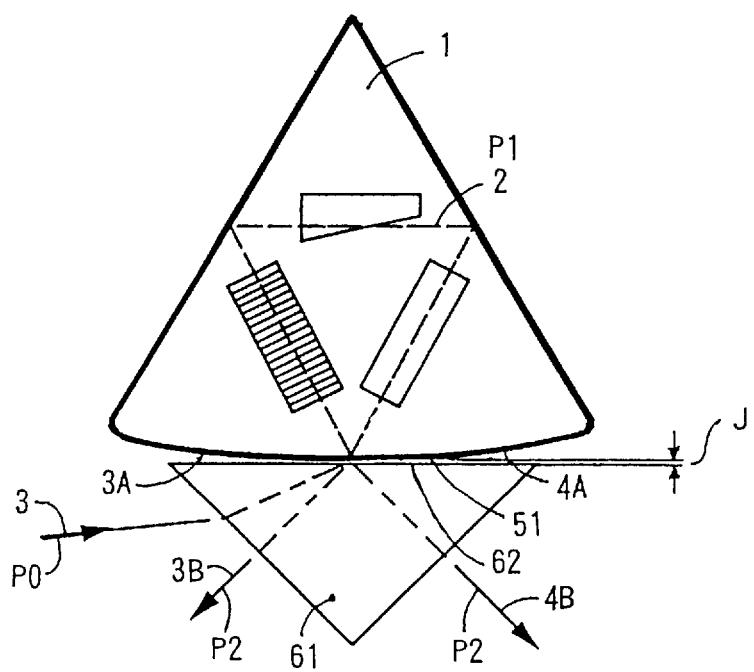
Figure 9:
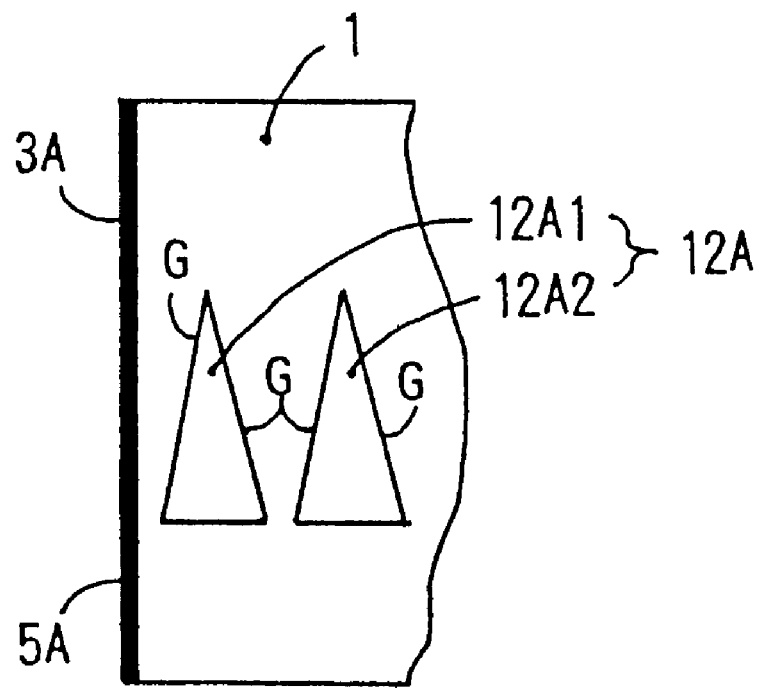
Figure 10:
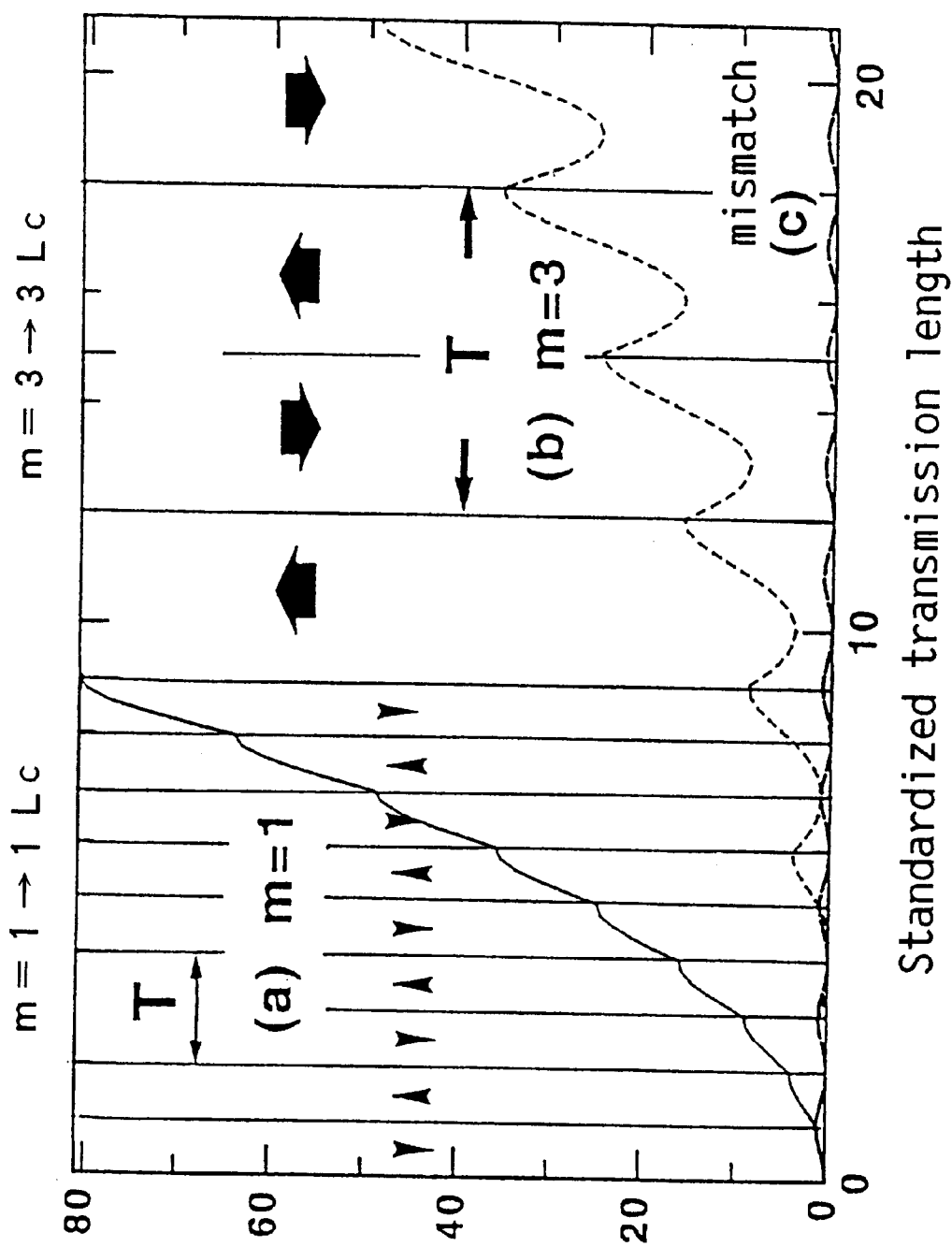
Figure 11:
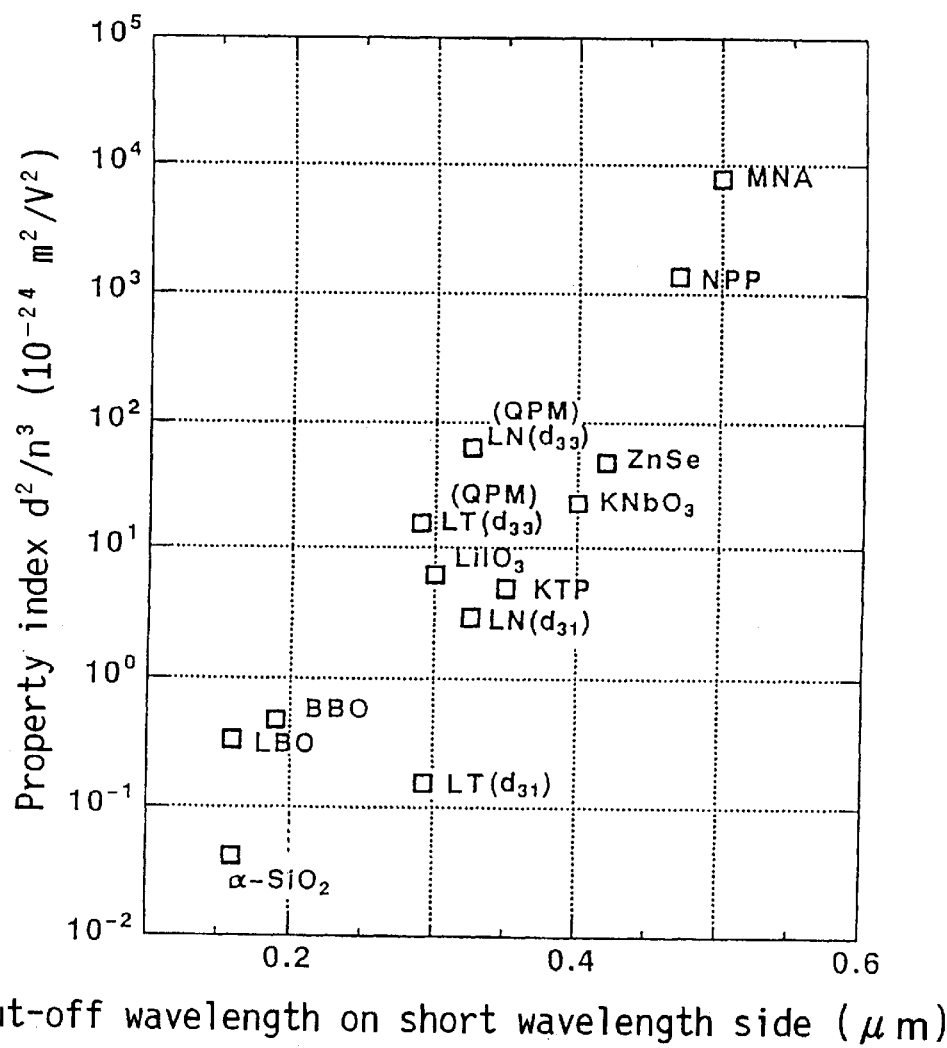
Figure 12:
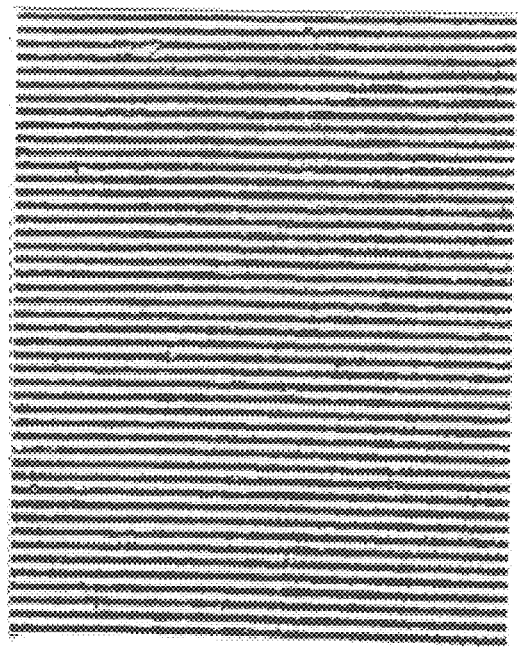
Figure 12:
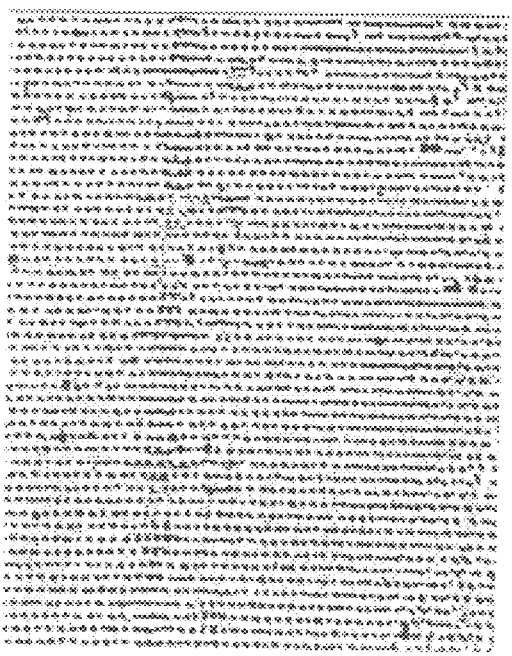
Figure 13:
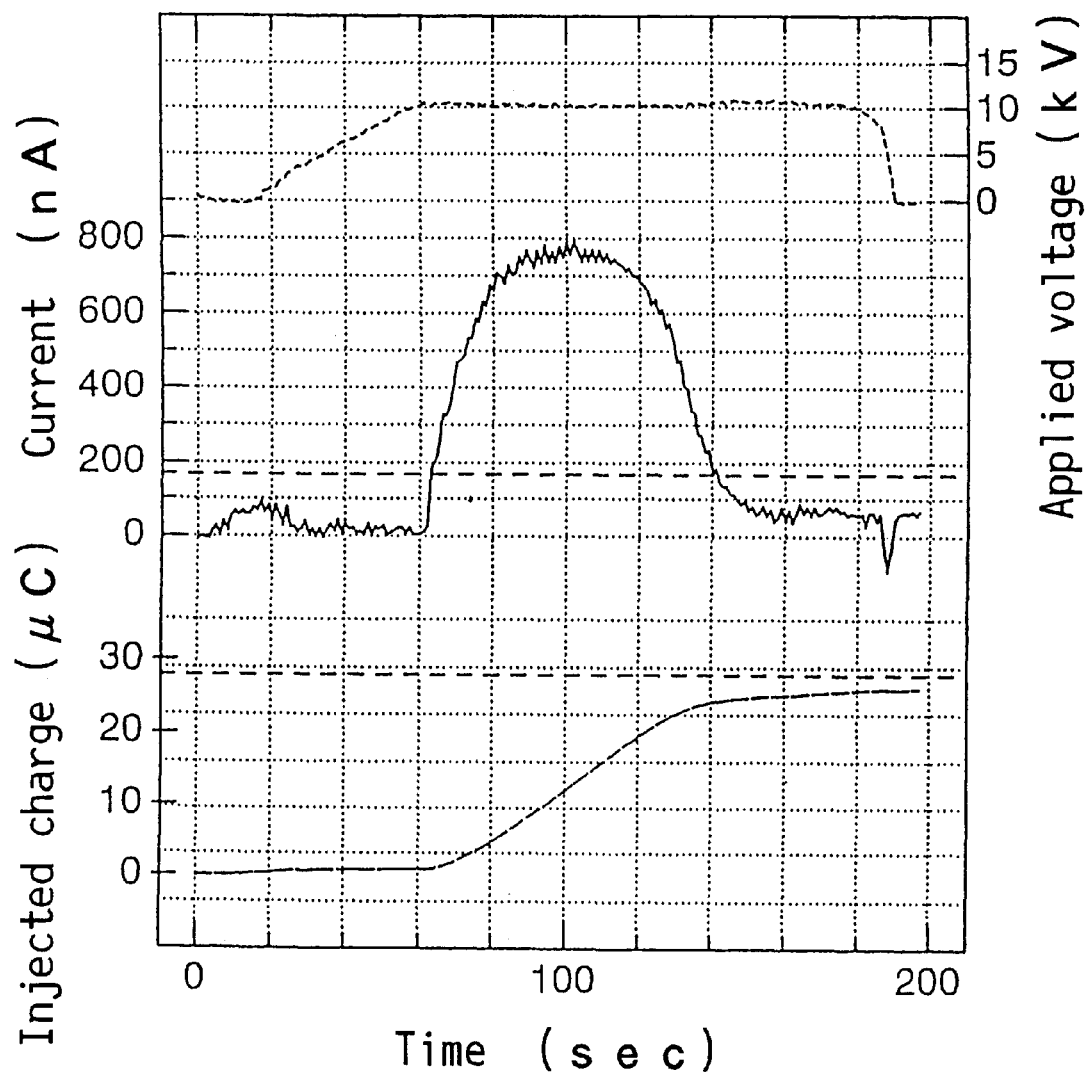
Figure 14:
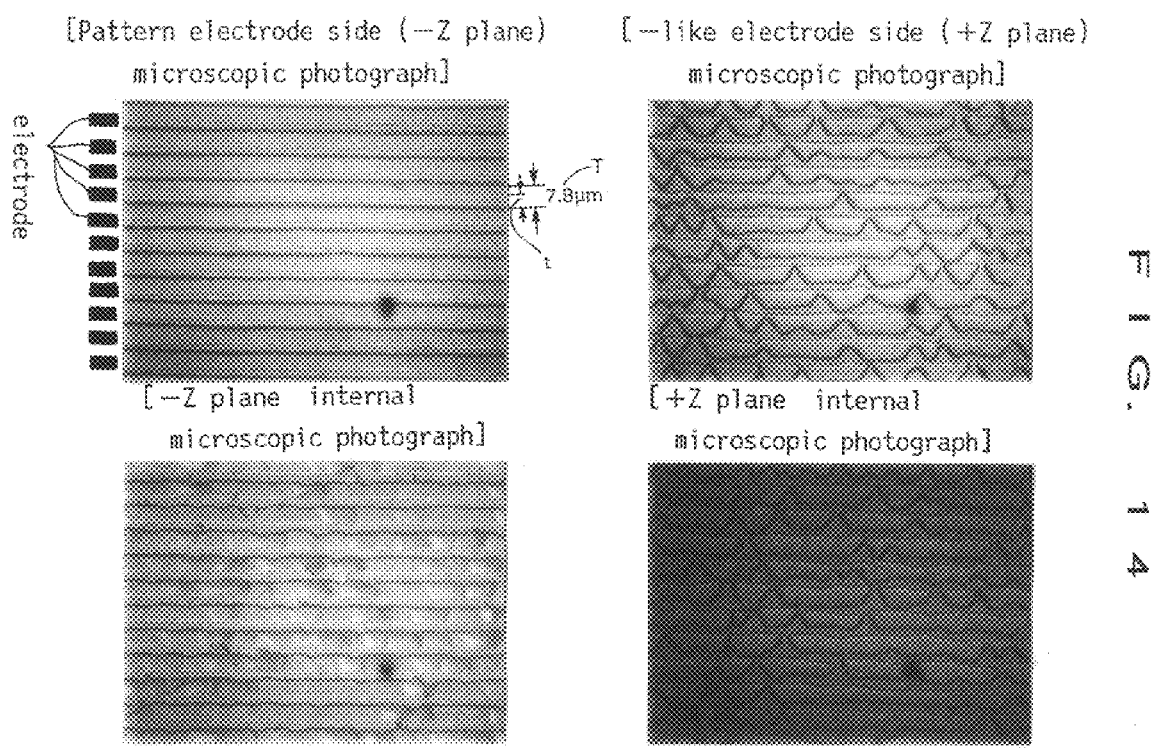
Figure 15:
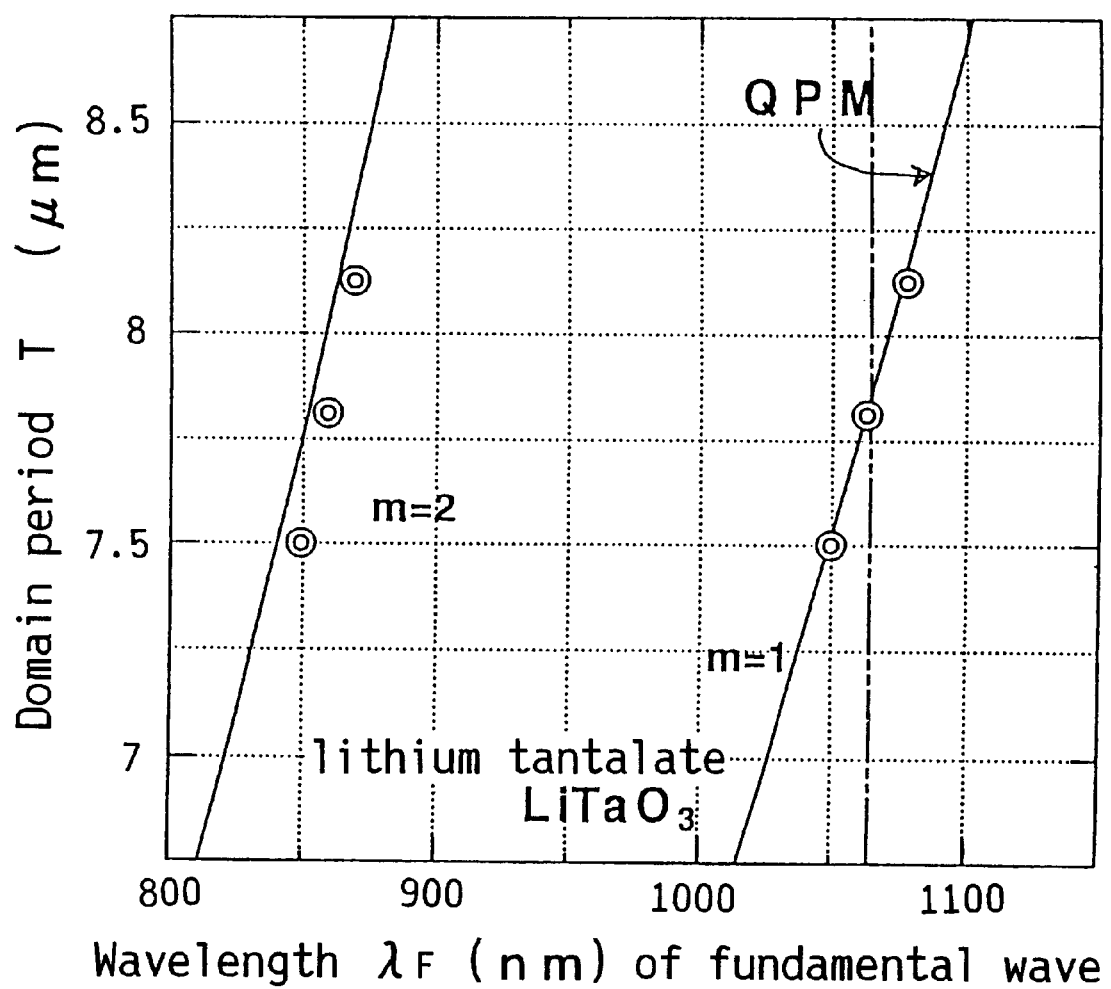
Figure 16:
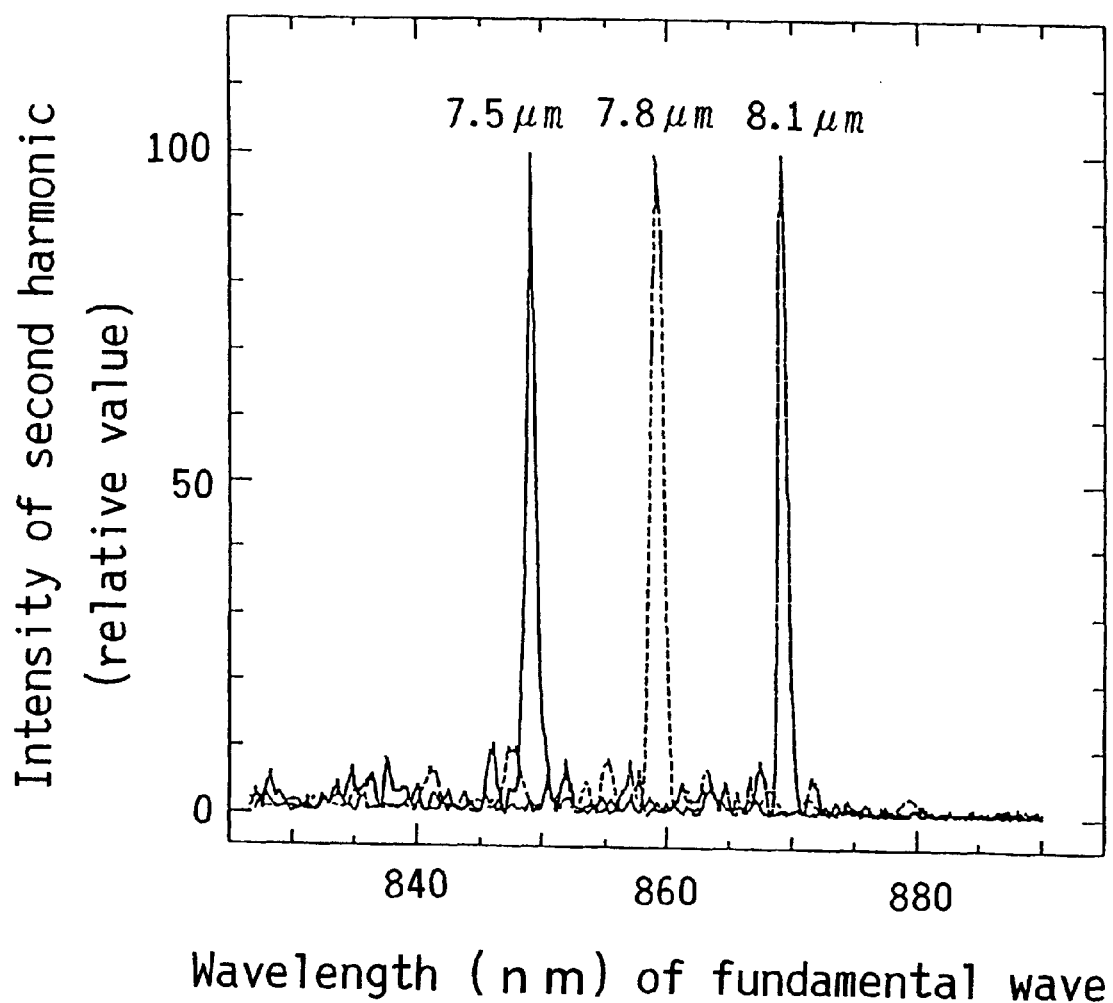
Figure 18:
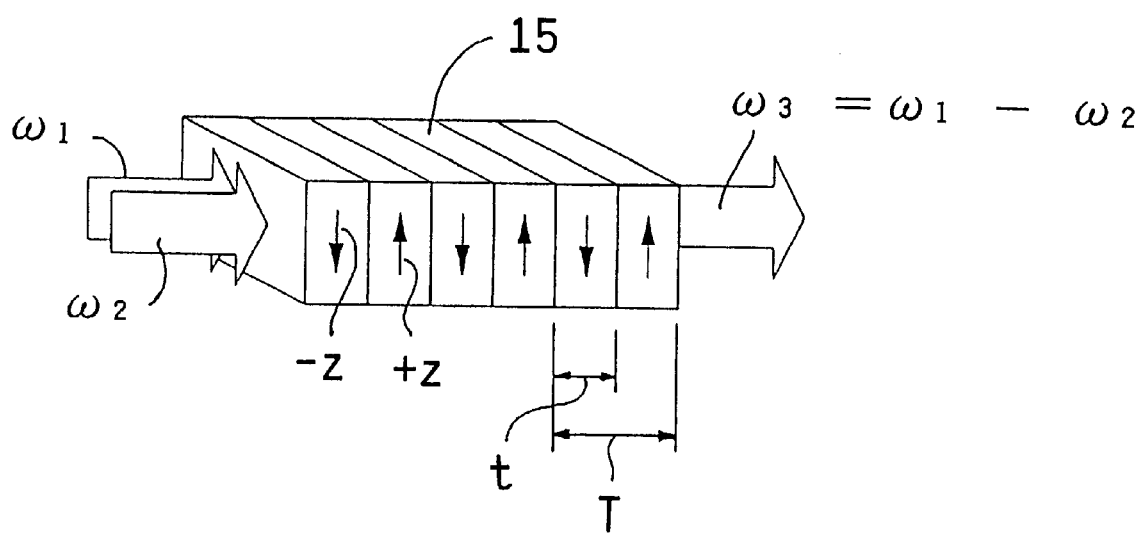
Figure 19:
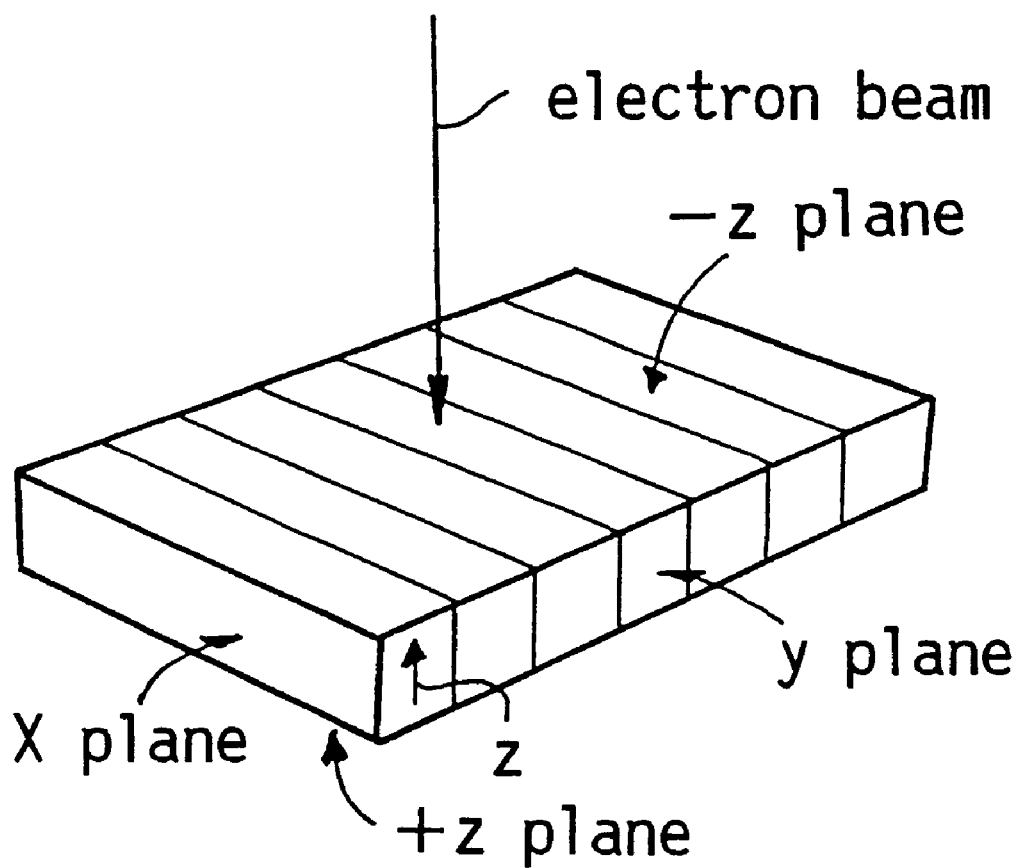

In FIG. 8, the optical crystal 1 is a plate having an outer shape of polygon, such as a triangle prism, wherein a semitransparent mirror 31A is set on a predetermined side, such as side 31, and reflecting mirrors 32A, 33A are formed on all the remaining sides or predetermined sides, such as sides 32 and 33.

In addition, a beam path 2 passing inside the optical crystal 1 is formed such that the light input from the input side 3 to mirror 31A is reflected on the reflecting mirrors 32A, 33A and output from the output side 3 of mirror 31A.

Moreover, periodic domain inversion part 15, electrodes 12A, 12B for Q switching and electrodes 9A, 9B for phase adjustment are formed on the both surfaces 8A, 8B at desired parts in path 2. When the optical crystal 1 along path 2 is developed at the cross section in the thickness direction, it has the same structure as that shown in [A–A' section] of the third embodiment shown in FIG. 5. That is, the total of the respective lengths Lt 1, Lt 2 and Lt 3 of the respective paths 2 between the respective mirrors 31A, 32A and 33A becomes the total length of path 2.

Note that quasi-phase matching by periodic domain inversion part 15, Q switching by electrodes 12A, 12B for Q switching and voltage E, and phase adjustment action by electrodes 9A, 9B for phase adjustment and voltage E1 are the same as those explained with regard to each embodiment mentioned above, and the shape of the polygon may be four or more-sided, and the desired side may be prepared into a reflecting surface to provide a similar construction. It is also evidently possible to layer periodic domain inversion part 15 and electrodes 12A, 12B for Q switching at a single position and particular explanation will not be needed.

As shown in FIG. 8, a construction wherein path 2 is dosed or a construction wherein path 2 is open by varying the angles of the polygon may be employed. When path 2 is dosed as in FIG. 8, since the end plane 3A on the input side 3 of path 2 and the end plane 4A on the output side 4 form the same end plane 51, a binding prism 61 may be formed near this end plane 51 to allow output of output light P2 from output path 4B corresponding to the output side 4 and output path 3B corresponding to the input side 3. Therefore, the output light P2 can be beneficially used for two different objects at the same time.

A further advantage includes the fact that the binding ratio of the light between binding prism 61 and optical crystal 1 can be changed by forming an adjustment part (not shown) to adjust the interval J between an end plane 62 of the binding prism 61 and an end plane 51 of the optical crystal 1.

In addition, in the construction of the sixth embodiment, respective reflecting mirrors, such as reflecting mirrors 32A, 33A, are formed into total reflecting mirrors by applying a thick material, which material being the same as the one applied to end planes 3A and 4A for semitransparent mirrors 5A, 5B in the above-mentioned first embodiment to fifth embodiment, or it may be directly applied in an increased number of layers in a multi-layer structure to the planes of sides 32 and 33 of optical crystal 1, thereby obliterating conventional complicated processing required for attachment of respective reflecting mirrors.

Modified Embodiment

This invention can be modified in the following manner.
(1) In the construction of each of the above-mentioned embodiment, periodic domain inversion part 15, electrodes 12A, 12B for Q switching and electrodes 9A, 9B for phase adjustment are optionally exchanged in position. However, a construction wherein electrodes 9A, 9B for phase adjustment and periodic domain inversion part 15 are layered at a single part is inadequate for phase adjustment, since periodic domain inversion part 15 comprises alternate inversion of z axis.
(2) In the construction of each of the above-mentioned embodiment, electrode 12A for Q switching is divided into plural electrodes 12A1, 12A2 shown in FIG. 9. In this case, electrode 12A for Q switching can be modified to have an oblique side G diagonally crossing the beam path 2, such as a triangle shown in FIG. 9 and a trapezoid.

Moreover, where necessary, electrodes 9A, 9B for phase adjustment and periodic domain inversion part 15 are divided into plural parts and disposed. In this case, the divided parts may be exchanged in position to be disposed appropriately in relation to the positions of other electrodes 12A, 12B for Q switching, electrodes 9A, 9B for phase adjustment and periodic domain inversion part 15.
(3) In the construction of si embodiment of the above-mentioned FIG. 8, electrodes 12A, 12B for Q switching may be superimposed on the part where periodic domain inversion part 15 is formed, in the same manner as in the second embodiment and fourth embodiment shown in FIG. 4 and FIG. 6. In this case, the periodic domain inversion part 15 may be moved to the parts of electrodes 12A, 12B for Q switching, or electrodes 12A, 12B for Q switching may be moved to the part where periodic domain inversion part 15 is disposed.
(4) In the sixth embodiment in the above-mentioned FIG. 8, electrodes 12A, 12B for Q switching may be removed as in the fifth embodiment shown in FIG. 7.
(5) In the first embodiment to fifth embodiment shown in the above-mentioned FIG. 1, FIG. 4, FIG. 5, FIG. 6 and FIG. 7, the end plane 3A on the input side 3 and mirror 5A are changed to curved surfaces having a focus placed at the center of the end plane 4A.
(6) In the above-mentioned third embodiment shown in FIG. 5, fourth embodiment shown in FIG. 6 and sixth embodiment shown in FIG. 8, electrode 12B for Q switching is formed to have the same shape with electrode 12A, such as a trapezoid.
(7) In the third embodiment of the above-mentioned FIG. 5, fourth embodiment shown in FIG. 6 and sixth embodiment shown in FIG. 8, the electrodes from among the electrodes 9A, 9B for phase adjustment, electrode 12B for Q switching and electrode 12A, which are on the common electric potential side are formed into a single sequential electrode of, for example, electrode 9B and electrode 12B as shown in FIG. 5 and FIG. 6.
(8) In the above-mentioned first embodiment to fifth embodiment shown in FIG. 1, FIG. 4, FIG. 5, FIG. 6 and FIG. 7, the end plane 3A on the input side 3 and mirror 5A are changed to curved surfaces having a focus placed at the center of the end plane 4A, and the end plane 4A and mirror 5B are changed to planes parallel to the z axis.
(9) In the sixth embodiment shown in the above-mentioned FIG. 8, the outer shape of the plane of the optical crystal 1 is formed into another polygon, such as pentagon and heptagon. In this case, the end plane 3A on the input side 3 and the end plane on the output side 4 are formed to construct a single common end plane, as shown in FIG. 8, or a polygon is formed in such a manner that they construct different and appropriate end planes thereof.

Industrial Applicability

According to this invention, a crystal having nonlinear optical character, electro-optical character and laser activity is used as an optical crystal as mentioned above. Therefore, by exciting laser activity ion in the optical crystal by a predetermined input light, laser oscillation is performed in the optical crystal itself to generate a light having a predetermined frequency.

In addition, inasmuch as all of or desired members from a periodic domain inversion part, electrodes for Q switching and electrodes for phase adjustment are appropriately selected and disposed in the beam path passing through the optical crystal, application of predetermined input light to a single optical crystal results in the generation of harmonic by QPM, output light by frequency conversion, output light by optical parametric oscillation utilizing QPM and the like. In addition, an optical device can be obtained, which is extremely convenient and capable of reinforcing the output light by synchronizing the oscillation frequency of the optical crystal to the frequency of the desired light, by merely adjusting the voltage to be applied to electrode for phase adjustment.

What is claimed is:

1. An optical device having a single device structure and which emits a coherent output beam having a predetermined frequency from a predetermined output plane of a single optical crystal simultaneously having nonlinear optical character, electro-optical character and laser activity, by giving a predetermined input light from a predetermined input plane of said single optical crystal to cause quasi-phase matching based on said nonlinear optical character of a periodic domain inversion part set in a predetermined path passing through the inside of said single optical crystal, comprising an electrode means for Q switching, which comprises facing electrodes disposed on both surfaces in the direction orthogonal with an optical axis of said single optical crystal, on parts different from a part where said periodic domain inversion part is set.

2. An optical device having a single device structure and which outputs a coherent output beam having a predetermined frequency from a predetermined output plane of a single optical crystal simultaneously having nonlinear optical character, electro-optical character and laser activity, by giving a predetermined input light from a predetermined input plane of said single optical crystal to cause quasi-phase matching based on said nonlinear optical character of a periodic domain inversion part set in a predetermined path passing through the inside of said single optical crystal, comprising
   (a) an electrode means for Q switching, which comprises facing electrodes disposed on both surfaces in the direction orthogonal with an optical axis of said single optical crystal, on parts different from a part where said periodic domain inversion part is set, and
   (b) a Q switching means for Q switching of said output light based on said electro-optical character, by changing, in a predetermined manner, a voltage to be applied between said facing electrodes.

3. An optical device having a single device structure and which emits a coherent output beam having a predetermined frequency from a predetermined output plane of a single optical crystal simultaneously having nonlinear optical character, electro-optical character and laser activity, by giving a predetermined input light from a predetermined input plane of said single optical crystal to cause quasi-phase matching based on said nonlinear optical character of a periodic domain inversion part set in predetermined path passing through the inside of said single optical crystal, comprising an electrode means for Q switching, which comprises facing electrodes disposed on both surfaces in the direction orthogonal with an optical axis of said single optical crystal, on a part where said periodic domain inversion part is set.

4. An optical device having a single device structure and which emits a coherent output beam having a predetermined frequency from a predetermined output plane of a single optical crystal simultaneously having nonlinear optical character, electro-optical character and laser activity, by giving a predetermined input light from a predetermined input plane of said single optical crystal to cause quasi-phase matching based on said nonlinear optical character of a periodic domain, inversion part set in a predetermined path passing through the inside of said single optical crystal, comprising
   (a) an electrode means for Q switching, which comprises facing electrodes disposed on both surfaces in the direction orthogonal with an optical axis of said single optical crystal, on parts where said periodic domain inversion part is set, and
   (b) a Q switching means for Q switching of said output light based on said electro-optical character, by changing, in a predetermined manner, a voltage to be applied between said facing electrodes.

5. The optical device of any one of claims 1 to 4, which generates a coherent light having a first frequency determined by laser activity and total length of said path, by exciting laser activity ion in said single optical crystal with said input light, and which emits, by said quasi-phase matching, an output light having a frequency which is twice greater than said first frequency.

6. The optical device of any one of claims 1 to 4, which generates a coherent light having a first frequency determined by said laser activity and total length of said path by exciting laser activity ion in said single optical crystal with said input light, and which emits, by said quasi-phase matching, a desired light from an output light having said first frequency, an output light having a second frequency by parametric oscillation of said first frequency and an output light having a third frequency by parametric oscillation of said first frequency.

7. The optical device of any one of claims 1 to 4, which generates, using said input light as two input lights, a coherent light having a first frequency determined by said laser activity and said total length of the path by exciting laser activity ion in said single optical crystal by one of said two input lights, and which emits, by said quasi-phase matching, said output light having a frequency which is a difference between said second frequency of the other input light of the above-mentioned two input lights, and said first frequency.

8. The optical device of any one of claims 1 to 4, which emits, using said input light having a first frequency, a coherent light having a second frequency determined by said laser activity and said total length of the path by exciting laser activity ion in said single optical crystal with said input light, and which emits, by said quasi-phase matching, said output light having a frequency which is a difference between second frequency and said first frequency.

9. An optical device having a single device structure and which emits a coherent output beam having predetermined frequency from a predetermined output plane of a single optical crystal simultaneously having nonlinear optical character, electro-optical character and laser activity, by giving a predetermined input light from a predetermined input plane of said single optical crystal to cause quasi-phase matching based on said nonlinear optical character of a periodic domain inversion part set in a predetermined path passing through the inside of said single optical crystal, comprising (a) an electrode means for Q switching, which comprises first facing electrodes disposed on both surfaces in the direction orthogonal with the optical axis of said single optical crystal, on parts different from the part where said periodic domain inversion part is set, and (b) a phase adjustment electrode means comprising second facing electrodes disposed at parts on said both surfaces, which are different from the parts where said periodic domain inversion part and said first facing electrodes are disposed.

10. An optical device having a single device structure and which emits a coherent output beam having a predetermined frequency from a predetermined output plane of a single optical crystal simultaneously having nonlinear optical character, electro-optical character and laser activity, by giving a predetermined input light from a predetermined input plane of said single optical crystal to cause quasi-phase matching based on said nonlinear optical character of a periodic domain inversion part set in a predetermined path passing through said single optical crystal, comprising, (a) an electrode means for Q switching, comprising first facing electrodes disposed on both surfaces in the direction orthogonal with an optical axis of said single optical crystal, on parts different from the part where said periodic domain inversion part is set, (b) a Q switching means for Q switching of said output light based on said electro-optical character, by changing, in a predetermined manner, a voltage to be applied to said first facing electrodes, (c) a phase adjustment electrode means comprising second facing electrodes disposed on said both surfaces, on parts different from parts where said periodic domain inversion part and said first facing electrodes are set, and (d) a phase adjustment means for adjusting the phase of a light transmitted in said path based on said electro-optical character, by changing, in a predetermined manner, a voltage to be applied between said second facing electrodes.

11. An optical device having a single device structure and which emits a coherent output beam having a predetermined frequency from a predetermined output plane of a single optical crystal simultaneously having nonlinear optical character, electro-optical character and laser activity, by giving a predetermined input light from a predetermined input plane of said single optical crystal to cause quasi-phase matching based on said nonlinear path passing through the inside of said single optical crystal, comprising (a) an electrode means for Q switching, comprising first facing electrodes disposed on said surfaces in the direction orthogonal with an optical axis of said single optical crystal, where said periodic domain inversion part is set, and (b) a phase adjustment electrode means comprising second facing electrodes disposed on said both surfaces, on parts which are different from parts where said first facing electrodes are disposed.

12. An optical device having a single device structure and which emits a coherent output beam having a predetermined frequency from a predetermined output plane of a single optical crystal simultaneously having nonlinear optical character, electro-optical character and laser activity, by giving a predetermined input light from a predetermined input plane of said single optical crystal to cause quasi-phase matching based on said nonlinear optical character of periodic domain inversion part set in a predetermined path passing through the inside of said single optical crystal, comprising (a) an electrode means for Q switching, comprising first facing electrodes at parts on both surface in the direction orthogonal with an optical axis of said single optical crystal, where said periodic domain inversion part is set, (b) a Q switching means for Q switching of said output light based on said electro-optical character, by changing, in a predetermined manner, a voltage to be applied to the first facing electrodes, (c) a phase adjustment electrode means comprising second facing electrodes disposed on said both surfaces, on parts which are different from parts where said first facing electrodes are disposed, and (d) a phase adjustment means for adjusting the phase of light transmitted in said path based on said electro-optical character, by changing, in a predetermined manner, a voltage to be applied between said second facing electrodes.

13. An optical device having a single device structure and which emits a coherent output beam having a predetermined frequency from a predetermined output plane of a single optical crystal simultaneously having nonlinear optical character, electro-optical character and laser activity, by giving a predetermined input light from a predetermined input plane of said single optical crystal to cause quasi-phase matching based on said nonlinear optical character of a periodic domain inversion part set in a predetermined path passing through the inside of said single optical crystal, comprising a phase adjustment electrode means comprising facing electrodes disposed on both surfaces in the direction orthogonal with an optical axis of said single optical crystal, on parts which are different from a part where said periodic domain inversion part is disposed.

14. An optical device having a single device structure and which emits a coherent output beam having a predetermined frequency from a predetermined output plane of a single optical crystal simultaneously having nonlinear optical character, electro-optical character and laser activity, by giving a predetermined input light from a predetermined input plane of said single optical crystal to cause quasi-phase matching based on said nonlinear optical character of a periodic domain inversion part set in a predetermined path passing through the inside of said single optical crystal, comprising (a) a phase adjustment electrode means comprising facing electrodes disposed on both surfaces in the direction orthogonal with an optical axis of said single optical crystal, on parts which are different from a part where said periodic domain inversion part is set, and (b) a phase adjustment means for adjusting the phase of a light transmitted in said path based on said electro-optical character, by changing, in a predetermined manner, a voltage to be applied between the facing electrodes.

15. The optical device of any one of claims 9 to 14, which emits a coherent light having a first frequency determined by said laser activity and the total length of said path, by exciting laser activity ion in said single optical crystal with said input light, and which emits, by said quasi-phase matching, an output light having a frequency which is twice greater than the first frequency.

16. The optical device of any one of claims 9 to 14, which emits a coherent light having a first frequency determined by said laser activity and the total length of said path, by exciting laser activity ion in said single optical crystal with said input light, and which emits, by said quasi-phase matching, a desired light from an output light having said first frequency, an output light having a second frequency by parametric oscillation of said first frequency and an output light having a third frequency by parametric oscillation of said first frequency.

17. The optical device of any one of claims 9 to 14, which emits, using said input light as two input lights, a coherent light having a first frequency determined by said laser activity and the total length of said path, by exciting laser activity ion in said single optical crystal with one of the two input lights, and by said quasi-phase matching, said output light having a frequency which is a difference between a second frequency of the other input light of the two input lights, and said first frequency.

18. The optical device of any one of claims 9 to 14, which emits, using said input light having a first frequency, a coherent light having a second frequency determined by said laser activity and the total length of said path as a mediation light, by exciting laser activity ion in said single optical crystal with said input light, and which emits, by said quasi-phase matching, said output light having a frequency which is a difference between the second frequency and said first frequency.

19. The optical device of any one of claims 1 to 4 and 9 to 14, wherein said single optical crystal is formed into a rectangular plate, two facing planes of said rectangle being formed as said input plane and said output plane, and said path is a linear path.

20. The optical device of any one of claims 1 to 4 and 9 to 14, wherein said single optical crystal is formed into a polygon plate, one plane corresponding to one side of said polygon being formed as said input plane and said output plane, and said path is formed by reflection by a predetermined side of said polygon.

* * * * *